United States Patent
Linck et al.

(10) Patent No.: US 12,065,618 B2
(45) Date of Patent: Aug. 20, 2024

(54) HYDRODEOXYGENATION OF OXYGENATED POLYMERS TO LIQUID HYDROCARBONS

(71) Applicant: Gas Technology Institute, Des Plaines, IL (US)

(72) Inventors: Martin B. Linck, Wilmette, IL (US); Terry Marker, Park Ridge, IL (US); Pedro Ortiz-Toral, Wheeling, IL (US); Jim Wangerow, Oak Park, IL (US)

(73) Assignee: GTI Energy, Des Plaines, IL (US)

( * ) Notice: Subject to any disclaimer, the term of this patent is extended or adjusted under 35 U.S.C. 154(b) by 0 days.

(21) Appl. No.: 17/182,783

(22) Filed: Feb. 23, 2021

(65) Prior Publication Data

US 2021/0348063 A1    Nov. 11, 2021

Related U.S. Application Data

(60) Provisional application No. 63/020,786, filed on May 6, 2020.

(51) Int. Cl.
| | | |
|---|---|---|
| *C10G 3/00* | (2006.01) | |
| *B01J 23/85* | (2006.01) | |
| *C08J 11/16* | (2006.01) | |

(52) U.S. Cl.
CPC ............... *C10G 3/49* (2013.01); *B01J 23/85* (2013.01); *C08J 11/16* (2013.01); *C10G 3/50* (2013.01);
(Continued)

(58) Field of Classification Search
None
See application file for complete search history.

(56) References Cited

U.S. PATENT DOCUMENTS

2010/0237290 A1*  9/2010  Rolland ............... C10G 11/05
                                                      252/373
2012/0260563 A1   10/2012  Marker et al.
(Continued)

FOREIGN PATENT DOCUMENTS

WO        2014063842 A1    5/2014
WO    WO-2018015608 A1 *   1/2018  ............ B01J 21/066

*Primary Examiner* — Youngsul Jeong
(74) *Attorney, Agent, or Firm* — Banner & Witcoff, Ltd.

(57) ABSTRACT

Process are disclosed for converting plastics, and especially thermoplastic oxygenated polymers, by hydrodeoxygenation (HDO) to hydrocarbons, such as aromatic hydrocarbons including benzene, toluene, ethylbenzene, and xylene isomers. These hydrocarbons may be recovered as chemicals and/or fuels, depending on the particular chemical structures of the starting materials, including the presence of oxygen in the polymer backbones. Advantageously, using a sufficiently active catalyst, only moderate conditions, such as in terms of hydrogen partial pressure, are required, in comparison to known hydrotreating processes. This leads to the formation, with fewer non-selective side reactions, of desired liquid hydrocarbons from substantially all carbon in the oxygenated polymer, as well as water from substantially all oxygen in the oxygenated polymer. In some cases, the liquid hydrocarbons obtained are platform chemicals that can be used for a number of specialized purposes. For example, they may be converted to monomers for regenerating the oxygenated polymer or otherwise for producing a different polymer.

28 Claims, 3 Drawing Sheets

(52) U.S. Cl.
CPC .............. *C10G 3/56* (2013.01); *C08J 2367/02* (2013.01); *C10G 2300/1003* (2013.01); *C10G 2300/4012* (2013.01); *C10G 2400/30* (2013.01)

(56) References Cited

U.S. PATENT DOCUMENTS

| | | | |
|---|---|---|---|
| 2013/0030230 A1* | 1/2013 | Brandvold | ............. C10G 1/086 585/242 |
| 2014/0275571 A1 | 9/2014 | Beck et al. | |
| 2018/0142177 A1* | 5/2018 | Dahlstrand | ............. C10L 5/447 |

* cited by examiner

HYDRODEOXYGENATION OF OXYGENATED POLYMERS TO LIQUID HYDROCARBONS

CROSS-REFERENCE TO RELATED APPLICATIONS

This application claims priority to U.S. provisional application No. 63/020,786, filed May 6, 2020, which is incorporated by reference in its entirety.

FIELD OF THE INVENTION

The disclosure is directed to the conversion of solid polymers, especially thermoplastic oxygenated polymers, to hydrocarbons by catalytic hydrodeoxygenation in a pressurized hydrogen environment.

BACKGROUND

For over 50 years, the global production and consumption of plastics have continued to increase, with each of these activities currently involving amounts of well over 300 million metric tons per year. The rate of increase is evident from the fact that more plastics have been produced in the past 10 years than in the preceding 100 years combined. While being versatile, lightweight, flexible, moisture resistant, strong, and relatively inexpensive, plastics are also durable and, for the most part, very slow to degrade. These characteristics, leading to high demand, and coupled with the human propensity to discard plastic containers by littering and polluting, have resulted in major environmental problems such as widespread plastic contamination of oceans. Increased consumption of plastic has also contributed to its being one of the major components of municipal solid waste. Also, problems associated with pollution due to "microplastics," referring to small plastic pieces of less than 5 mm in length, have begun to attract significant attention.

The challenge of addressing plastic waste has been met with efforts to recycle and reuse this material as opposed to disposal at landfill sites. The expense associated with recycling, however, generally makes this process an uneconomical proposition. As a result, at most about 16% of all plastic waste is recycled. In the case of polyethylene terephthalate (PET), worldwide production is likely to reach well over 85 million metric tons by 2022, with the current U.S. production of this plastic exceeding 3 million metric tons, mostly for creating single-use, disposable consumer products. These include packaging materials that exhibit high barrier properties to gases such as $O_2$ and $CO_2$, which can prolong the shelf life of foods and beverages. PET films can be used to manufacture pouches, wrappers, and heat shrink materials having high mechanical strength. However, only about 31% of PET is currently "recycled," with this term rarely involving the actual re-use of PET in its original role, such as in the case of a PET bottle being re-used to make new bottles. More commonly, recycling involves the polymer being "down-cycled" to a lower value product, as streams of recovered PET become increasingly contaminated with each cycle of use. Contamination generally leads to undesired coloration, whereas PET color, or more accurately the absence of PET color, is important for applications such food packaging and particularly beverage bottle manufacturing. This is mainly because consumers readily perceive a lack of transparency (e.g., yellowness) in the plastic as being indicative of an inferior material.

The same issues are foreseeable with respect to biopolymers, including poly(alkylene furan dicarboxylate) polymers that are derived from hexose carbohydrates (e.g., fructose) and their oligomers. Prominent examples of such polymers are poly(ethylene furan dicarboxylate), or PEF, and poly(trimethylene furan dicarboxylate), or PTF, which can exhibit comparable or even superior properties relative to their largely fossil fuel-derived counterpart, PET. In the realm of biopolymers, a naturally occurring example is lignin (or sulfonated lignin) approximately 50 million metric tons of which are annually extracted from wood pulp as a byproduct of paper manufacturing via the kraft or sulfate process. Additional amounts of lignin are generated by the lignocellulosic ethanol industry. Due to its complex structure and inconsistent physical and chemical properties, about 98% of lignin is incinerated for its heating and electricity generating value, meaning that the material potential of lignin is largely unused.

Attempts to recover higher value products, including specific chemical compounds as well as blends useful for fuels, from waste plastics have involved pyrolysis and gasification. The former refers to thermal degradation of large molecules in the absence of oxygen, with the objective of making liquid pyrolysis oil that generally requires further refining to obtain hydrocarbons. The latter refers a thermal treatment with a gas such as air or steam, resulting in a stream of syngas ($CO+H_2$) that can be used in the production of hydrocarbons and/or alcohols. Both of these techniques result in solid residues (e.g., char), and to date neither has proven to be economically viable in terms of generating value from waste plastic. As a result, rather than being refashioned into new products, almost 80% of plastics (and over 99% of plastic bags) being produced continue to accumulate in landfills, be combusted, or otherwise become a source of pollution to both land and sea.

SUMMARY

Embodiments disclosed herein are associated with the discovery of processes for converting plastics, and especially thermoplastic oxygenated polymers, to hydrocarbons that may include specialty chemicals in cases of polymers having particular structures. Whereas the current valuation for such polymers may be based on their combustion energy value, processes described herein can chemically transform carbon-, oxygen-, and hydrogen-containing structures of polymers via hydrodeoxygenation (HDO) into desired hydrocarbons including aromatic hydrocarbons (e.g., benzene, toluene, ethylbenzene, and xylene isomers). Hydrodeoxygenation refers to the deoxygenation of polymer structures at the molecular level, and preferably the removal of oxygen atoms from the polymer backbone, or chain linking one monomeric residue to the next, in the presence of sufficient temperature and hydrogen partial pressure. This leads to the formation, in addition to water, of smaller hydrocarbons that represent, or are derived from, molecular sub-units between the oxygen atoms of the polymer backbone. In some cases, these molecular sub-units represent precursors or other forms of the same monomers that are used in producing the polymer, and water.

For example, in the case of PET that is produced from the copolymerization of terephthalic acid (TPA) and ethylene glycol, hydrodeoxygenation can produce both para-xylene (which can be considered a "deoxygenated" precursor of TPA) and ethane (which can be considered a "deoxygenated" form of ethylene glycol) in high yields, such as in nearly stoichiometric quantities and in nearly purified forms.

In this regard, para-xylene is considered a fine chemical having a number of potential commercial uses, including the re-formation of PET. To the extent that more complex oxygenated polymers, such as lignin, are composed of a wider variety of molecular sub-units linked by oxygen atoms in a relatively unpredictable manner, the hydrodeoxygenation of such polymers yields a comparably wider variety of hydrocarbons. The obtained hydrocarbon mixtures, however, are nonetheless valuable (e.g., as transportation fuels), particularly in view of the aromatic character of the molecular sub-units being substantially retained, i.e., ring hydrogenation is substantially avoided under preferred operating conditions. This may lead, for example, to the production of predominantly $C_6$-$C_8$ aromatic hydrocarbons, which in some embodiments are useful as high-octane fuels (e.g., gasoline) or fuel blending components.

Ethane and/or other light hydrocarbons such as methane and propane, which may be produced from deoxygenation of a given oxygenated polymer, can advantageously be used in the generation of hydrogen, through reforming, thereby reducing the net consumption of hydrogen by the process or even enabling sustained operation whereby no added hydrogen is required under steady-state operation. In this manner, the process steps of HDO and reforming in combination can result in the continuous extraction of hydrogen from oxygenated polymers, with the re-use of that hydrogen to efficiently recover their valuable characteristic molecular sub-units, and particularly hydrocarbons.

Thermoplastic oxygenated polymers may be fossil fuel-derived materials such as PET, or biologically derived materials such as lignin or beeswax. With respect to a broad scope of oxygenated polymers, advantages reside in the discovery that relatively mild operating conditions, such as a combination of moderate reaction temperatures and hydrogen partial pressures, together with an active catalyst, can be used to selectively remove oxygen atoms from the polymer structure, and preferably its backbone. Under such conditions, the desired chemistry is promoted, whereas condensation and elimination reactions that require more severe processing, as well as aromatic ring saturation, are largely avoided. Condensation and elimination undesirably lead to the formation of solid carbonaceous residues that would otherwise rapidly deactivate the catalyst through coking. Moreover, the process operating condition requirements, and particularly the relatively low hydrogen partial pressures and associated total pressures when compared to conventional pressures proposed for the hydrotreating of polymers, reduce equipment costs and thereby improve overall process economics.

Advantageously, therefore, operating conditions and catalysts described herein selectively carry out the "easiest" yet most desirable hydrotreating chemistry, namely hydrodeoxygenation, while substantially avoiding undesirable hydrotreating chemistry involving higher energies of activation. Such reactions include aromatic ring saturation and hydrocracking to form significant quantities of light gases (e.g., methane), which can detract from the overall product value and/or result in reduced liquid hydrocarbon yields. Accordingly, in the case of lignin or other oxygenated polymer, it may be desirably converted by hydrodeoxygenation, without promoting undesired side reactions, such that substantially all hydrogen being consumed in an HDO reactor, or otherwise this reactor in combination with a downstream, supplemental deoxygenation reactor, is reacted to form water. A minor amount of oxygen originally present in the oxygenated polymer may be liberated by decarbonylation to yield CO or decarboxylation to yield $CO_2$, for example as the result of unavoidable elimination reactions. However, the formation of these non-condensable gases is generally undesirable in the context of processes described herein and will not account for a preponderance of the overall hydrogen consumption.

Particular embodiments are directed to processes for the production of hydrocarbons from an oxygenated polymer, with representative processes comprising contacting reactant hydrogen and a feed comprising a flowable form of the oxygenated polymer, such as a form having sufficiently low viscosity that it can be pumped, with a solid hydrodeoxygenation (HDO) catalyst. The contacting may occur under relatively moderate conditions, such as at a maximum temperature, and/or at a hydrogen partial pressure within a range, as described herein. Such conditions may be characteristic of operating conditions of an HDO reactor that contains the catalyst. The contacting provides an HDO product comprising the hydrocarbons, having carbon atoms derived from, or initially present in, the oxygenated polymer. Other particular embodiments are directed to integrated hydrodeoxygenation (HDO) processes comprising: preparing a flowable form of an oxygenated polymer, and feeding the flowable form of the oxygenated polymer and reactant hydrogen to an HDO reactor containing a solid HDO catalyst. The HDO reactor advantageously operates at relatively moderate conditions, such as at a temperature, and/or at a hydrogen partial pressure, within respective ranges as described herein. Such processes may further comprise withdrawing an HDO reactor effluent, and obtaining, from the HDO reactor effluent, an HDO product comprising hydrocarbons. The HDO product may be obtained from the HDO reactor effluent withdrawn directly from the HDO reactor, or from the effluent of a downstream supplemental deoxygenation reactor, to which the HDO reactor effluent is subjected, to perform further deoxygenation. As another alternative, the HDO product may be obtained from the effluent of a downstream hydrocracking zone (e.g., contained within the HDO reactor) or downstream separate hydrocracking reactor, to which either the HDO reactor effluent or the effluent of a supplemental deoxygenation reactor is subjected, to perform cracking of hydrocarbons that are molecular sub-units derived from the oxygenated polymer.

Further embodiments disclosed herein are directed to processes for the effective recycling of PET and other thermoplastic oxygenated polymers, as needed to restore their characteristics for commercial applications. Advantageously, hydrodeoxygenation can effectively result in the conversion of such polymers back to materials useful for their manufacture. In the case of PET, for example, para-xylene is the main (and most valuable) component. This fine chemical, obtained from hydrodeoxygenation, can then be used, through the formation of its oxidized intermediate TPA, to remake PET with the necessary level of purity for commercial applications such as plastic bottles. Otherwise, para-xylene, following its oxidation to the monomer TPA, can be used in the synthesis of different oxygenated polymers, such as polyamides, depending on market demand. Accordingly, aspects of the invention relate to the provision of low-cost solutions for the true "recycling" of oxygenated plastics and/or the interconversion of plastics, and particularly waste plastics, of one type to high quality plastics of a different type.

Accordingly, embodiments are directed to processes for the production of an upgraded polymer from a waste oxygenated polymer having oxygen atoms in a backbone of the oxygenated polymer. Representative processes comprise:

contacting reactant hydrogen and a feed comprising a flowable form of the oxygenated polymer with a solid hydrodeoxygenation (HDO) catalyst at relatively moderate conditions, such as at a temperature and/or at a hydrogen partial pressure, within respective ranges as described herein. This provides an HDO product comprising hydrocarbons obtained from molecular sub-units between the oxygen atoms in the backbone of the oxygenated polymer. The processes further comprise using the hydrocarbons for the production of the upgraded polymer.

Yet further embodiments are directed to processes as described above in which the HDO reactor is used for hydroprocessing of hydrocarbons, such as in the case of hydrotreating a hydrocarbon-containing feed to remove nitrogen (N) and/or sulfur (S) heteroatoms and/or hydrocracking such feed to reduce its molecular weight. Such embodiments, in which oxygenated polymer deoxygenation is integrated with the hydroprocessing of hydrocarbons, may therefore comprise the co-processing of the flowable form of the oxygenated polymer with the hydrocarbon-containing feed, such as a hydrocarbon fraction, for example, a straight-run diesel fraction or vacuum gas oil (VGO). Nitrogen initially present in both the oxygenated polymer and in the hydrocarbon-containing feed may be removed and/or recovered as ammonia ($NH_3$) in a gaseous mixture obtained from such integrated process, and/or sulfur initially present in both the oxygenated polymer and in the hydrocarbon-containing feed may be removed and/or recovered as hydrogen sulfide ($H_2S$) in such gaseous mixture. In addition, a solvent used in preparing a flowable form of the oxygenated polymer (e.g., as a first component of the feed) may be, or may comprise, all or a portion of the hydrocarbon fraction (e.g., as a second component of the feed) that is subjected to hydroprocessing. In this manner, the hydroprocessing of the solvent, whether such hydroprocessing comprises hydrotreating, hydrocracking, or a combination of these, may contribute to the amount (or add to the yield) of hydrocarbons of the same types in the HDO product that are conversion products of the oxygenated polymer.

Aspects related to process integration are associated with methods for modifying (e.g., retrofitting) a hydrotreating or hydrocracking process or facility (plant), such as a facility that is under-utilized or decommissioned. Particular modifications involve the addition of an upstream preparation stage for preparing a flowable form of an oxygenated polymer. Other related aspects are associated with integrated facilities (plants), having been modified (e.g., retrofitted) in this manner.

These and other embodiments and aspects, together with their associated advantages, will be apparent from the following detailed description, in conjunction with the drawing figures.

BRIEF DESCRIPTION OF THE DRAWINGS

Exemplary embodiments of the present disclosure are illustrated in the accompanying figures, in which the same reference numbers are used to indicate the same or similar features.

FIGS. 1-3 should be understood to present simplified overviews of processes and their associated equipment, in order to demonstrate certain principles involved. The depicted elements are not necessarily drawn to scale; nor do the illustrated processes and equipment associated therewith preclude the addition of any upstream, intermediate, or downstream steps, such as separating, combining, and/or reacting steps. For example, an intermediate recycling step could involve both separating and combining. As is apparent to one skilled in the art, having knowledge of the present disclosure, other processes may have alternative configurations and/or components that are governed by specific operating objectives, but which alternatives are nonetheless within the scope of the invention as defined by the appended claims.

DETAILED DESCRIPTION

Figure 1:
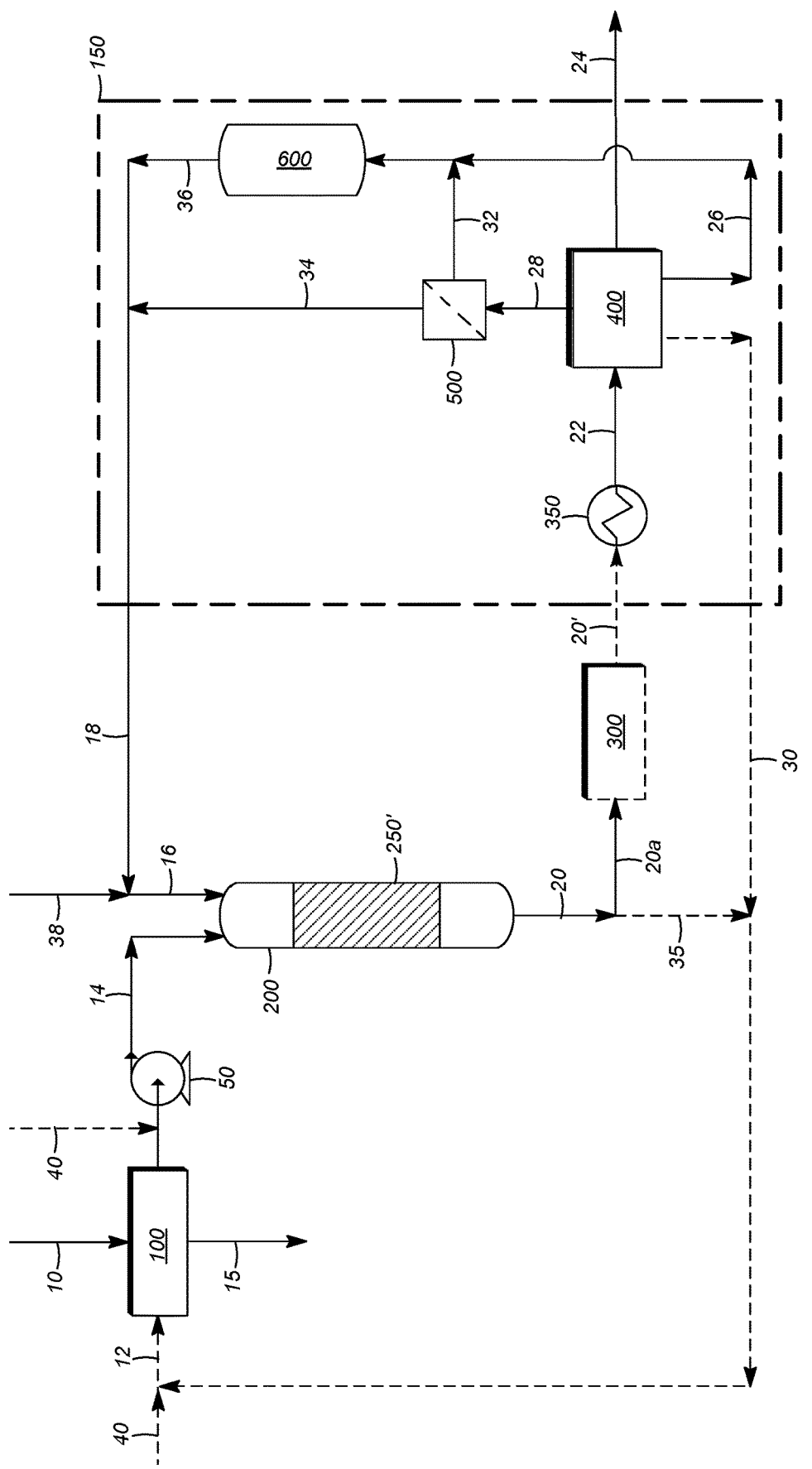
FIG. 1 is a schematic flow diagram of a process for the hydrodeoxygenation of an oxygenated polymer, in which flows of a hydrogen-containing gas (reactant hydrogen) and a flowable form of the polymer are directed downwardly through a reactor, such as in the case of a trickle-bed reactor.

Oxygenated Polymers, and Intermediates and Hydrocarbons Obtained from HDO

Processes are disclosed herein for the conversion of one or more oxygenated polymers, such as waste consumer plastics and polymer byproducts of manufacturing, into hydrocarbons. Oxygenated polymers of particular interest include thermoplastic polymers that can be softened or melted with the application of heat. According to particular embodiments, the one or more oxygenated polymers may be selected from polyesters, polyethers, polycarbonates, polyurethanes, polyamides, polyacrylates, and mixtures thereof. These may be derived from petroleum or otherwise from biological materials (biomass), such as carbohydrates including sugars. Examples of polyesters include poly(alkylene terephthalate) polymers such as polyethylene terephthalate (PET), as well as poly(alkylene furan dicarboxylate) polymers such as polyethylene 2,5-furandicarboxylate (PEF). Examples of polyethers include polyether polyols and particularly polyalkylene glycols, which may be based on ethylene oxide, propylene oxide, and/or other alkylene oxides. Specific examples are polyethylene glycol, polypropylene glycol, polybutylene glycol, polytetramethylene ether glycol, polypropylene oxide glycol, and polybutylene oxide glycol. Other examples of polyethers include polyether ether ketone (PEEK) polymers and epoxy resins such as bisphenol A diglycidyl ether. Examples of polyurethanes include thermoplastic polyurethanes based on aliphatic diisocyanates, such as hexamethylene diisocyanate (HDI) or isophorone diisocyanate (IPDI), as well as thermoplastic polyurethanes based on aromatic diisocyanates, such as toluene diisocyanate (TDI), methylene diphenyl diisocyanate (MDI), and polymeric methylene diisocyanates. Examples of polyamides include aliphatic polyamides such as nylons, examples of which are polyamide 6 (nylon 6 or polycaprolactam) and polyamide 6,6 (nylon 6,6 or polyhexamethylene adipamide). Polyamides also include aromatic polyamides (aramids), examples of which are Kevlar® and Twaron®. Examples of polyacrylates include poly(methacrylate) and poly(methyl methacrylate). According to other particular embodiments, the one or more oxygenated polymers may be biological materials obtained, for example, as byproducts from paper manufacturing and other industries. Examples include lignin and polymeric carbohydrates such as cellulose and hemicellulose, as well as derivatized cellulose such as cellulose triacetate.

Preferred oxygenated polymers, such as thermoplastic oxygenated polymers that may be either bio-based or petroleum-based, include those in which oxygen atoms are present in the polymer backbone. In this case, the removal of these oxygen atoms liberates relatively small molecular sub-units (fragments) that are, or that at least include portions of (i) one or more aromatic hydrocarbons such as benzene, toluene, xylenes, and/or ethylbenzene, and/or (ii) one or more aliphatic hydrocarbons such as $C_1$-$C_{10}$ straight chain or branched chain hydrocarbons, and more typically one or more $C_2$-$C_5$ straight chain or branched chain hydrocarbons. In the case of molecular sub-units that include portions of aromatic hydrocarbons, such sub-units are meant to extend to oxygenated derivatives of the aromatic hydrocarbons, such as hydroxylated and optionally $C_1$-$C_5$ alkylated benzene derivatives, with examples including one or more of phenol, cresols, and their benzene polyol or alkylated benzene polyol derivatives. In the case of molecular sub-units that include portions of aliphatic hydrocarbons, such sub-units are meant to extend to oxygenated derivatives of the aliphatic hydrocarbons, such as hydroxylated straight chain or branched chain alkanes, with examples including one or more $C_1$-$C_{10}$ straight chain or branched chain alcohols, and more typically one or more straight chain or branched chain $C_2$-$C_5$ alcohols. Oxygenated derivatives, as molecular sub-units, are generally of higher value relative to the oxygenated polymers from which they are obtained by hydrodeoxygenation, particularly if the oxygenated polymer is valued as a fuel. Such increase in value may be at least due to the increased energy density of the molecular sub-units as a whole, or otherwise due to their market value as individual compounds. Moreover, oxygenated derivatives as molecular sub-units are amenable to further deoxygenation to hydrocarbons with further increased energy density as a whole, such as fuels including gasoline boiling-range hydrocarbons and/or diesel boiling-range hydrocarbons. In general, but particularly in the case of oxygenated derivatives being all or substantially all (e.g., at least about 95 wt-%) derivatives of a single type of hydrocarbon, further deoxygenation may result in one or more hydrocarbons valued as fine (or specialty) chemicals individually, for purposes other than combustion. Such purposes may include the synthesis of polymers of the same type as the oxygenated polymer or of a different type.

Oxygenated compounds (oxygenated derivatives or intermediate derivatives) as molecular sub-units may be considered in combination as a "partially deoxygenated intermediate" that may require further deoxygenating, such as in a separate, supplemental deoxygenation reactor, to yield hydrocarbons, and particularly fine chemicals or fuels as described herein. However, these hydrocarbons may alternatively, and preferably, be obtained following hydrodeoxygenation in a single HDO reactor. If used, a supplemental deoxygenation reactor may be configured downstream of the HDO reactor, to directly accept an HDO reactor effluent of a portion thereof, as a process liquid or vapor stream, or a combined liquid and vapor stream. For example, oxygenated compounds such as phenol, which, although liberated from the oxygenated polymer, have not been fully deoxygenated, may then become fully deoxygenated to hydrocarbons such as benzene in a supplemental deoxygenation reactor.

An HDO product of processes described herein may therefore comprise hydrocarbons obtained from (e.g., originally present as or otherwise derived from) molecular sub-units between oxygen atoms in the backbone of an oxygenated polymer as described herein. Hydrodeoxygenation of oxygenated polymers, optionally with further (downstream) deoxygenating, can result in high yields, such as nearly stoichiometric yields based on carbon, of one, two, three, or more hydrocarbons that are, or that are derived from, molecular sub-units. In some embodiments, the total (or combined) yield(s) of carbon in such one, two, three, or more hydrocarbons is at least about 50 wt-%, at least about 65 wt-%, at least about 85 wt-%, or even at least about 90 wt-%, of the weight of carbon in the oxygenated polymer. Otherwise, or in addition, the individual yield of carbon in any one of such one, two, three, or more hydrocarbons is least about 50 wt-%, at least about 6 wt-%, at least about 85 wt-%, or even at least about 90 wt-%, of the weight of carbon in the oxygenated polymer that forms such respective hydrocarbon upon hydrodeoxygenation.

For example, in the case of PET, this oxygenated polymer has a structure composed of repeating monomeric residues of the formula

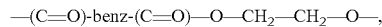

wherein benz is a divalent phenyl radical of the formula $C_6H_4$. The weight of carbon in this structure, and consequently in the oxygenated polymer itself, is about 64%. It can also can be appreciated that complete hydrodeoxygenation of this structure would yield, as molecular sub-units, the 8-carbon hydrocarbon para-xylene ($CH_3$-benz-$CH_3$) and the 2-carbon hydrocarbon ethane ($CH_3$—$CH_3$). Therefore, theoretically each 100 grams of PET could yield 64 grams of carbon in para-xylene and ethane combined, including 51 grams of carbon that form para-xylene (64*8/10) and 13 grams of carbon that form ethane (64*2/10). For purposes of explanation, in the case of hydrodeoxygenation of 100 grams of PET resulting in 45 grams of carbon in para-xylene (or 51 total grams of paraxylene) and 10 grams of carbon in ethane (or 13 total grams of ethane), the combined (actual) yield of carbon in these products would be (10+45)/64=86% of the weight of carbon in the PET. The individual (actual) yield of carbon in para-xylene would be 45/51=88% of the weight of carbon in the PET that forms para-xylene, and the individual (actual) yield of carbon in ethane would be 10/13=77% of the weight of carbon in PET that forms ethane.

Accordingly, in representative processes, the oxygenated polymer is PET and liquid hydrocarbons that may be recovered in an HDO product, or separated from an HDO reactor effluent, include para-xylene, whereas gaseous hydrocarbons that may be recovered in a gaseous mixture, separated from this effluent, include ethane. One skilled in the art, having knowledge of the present disclosure, can determine molecular sub-units (e.g., hydrocarbons) resulting from hydrodeoxygenation of other oxygenated polymers, in addition to theoretical and actual yields based on carbon, of combined and individual molecular sub-units (e.g., hydrocarbons). Some preferred types of oxygenated polymers, such as lignin, may have multiple, varying types of monomeric residues, such that hydrodeoxygenation, optionally with further deoxygenating, may result in correspondingly varying types of hydrocarbons, each having a theoretical yield based on carbon, as governed by the particular polymer structure. Advantageously, lignin may comprise any of a number of valuable molecular sub-units, many or most of which are aromatic hydrocarbons or oxygenated derivatives thereof, or are otherwise aliphatic hydrocarbons or oxygenated derivatives thereof. The hydrodeoxygenation of lignin and other oxygenated polymers having aromatic rings in their structures can provide an HDO product comprising a mixture of aromatic hydrocarbons, or otherwise a mixture of aromatic and aliphatic hydrocarbons, that may be suitable as a transportation fuel (e.g., gasoline) or blending component of such fuel. Therefore, in representative processes, the oxygenated polymer is lignin and liquid hydrocarbons that may be recovered in an HDO product, or separated from an HDO reactor effluent, include both gasoline boiling-range hydrocarbons and diesel boiling-range hydrocarbons.

Preferably, for any given oxygenated polymer, the combined yield of carbon in hydrocarbons obtained from its hydrodeoxygenation, optionally with further deoxygenating, may be in the ranges described above with respect to carbon in the oxygenated plastic. In some embodiments, an HDO product, following its separation from an HDO reactor effluent, or optionally following its separation from a supplemental deoxygenation reactor effluent, may comprise at least about 75 wt-%, at least about 85 wt-%, at least about 95 wt-%, or even at least about 99 wt-%, of hydrocarbons. The balance of the HDO product, or substantially the balance, may be oxygenated compounds (intermediate derivatives) as described above, such that hydrocarbons and these oxygenated compounds may represent at least about 95 wt-%, at least about 97 wt-%, or at least about 99 wt-%, of the weight of the total HDO product. Whether separated from the effluent of an HDO reactor or of a downstream, supplemental deoxygenation reactor, this separation of the HDO product may include the removal of a gaseous mixture comprising hydrogen and non-condensable hydrocarbons, in addition to the removal of an aqueous product, both of which gaseous mixture and aqueous product are components of the effluent. Accordingly, the HDO product may be provided following a separation from this gaseous mixture and/or aqueous product.

In addition to polyesters such as PET, preferred oxygenated polymers having oxygen atoms present in their polymer backbones include polyethers, polycarbonates, and thermoplastic polyurethanes, as well as lignin and carbohydrate polymers. Oxygenated polymers such as thermoplastic polyurethanes and polyamides have nitrogen in their monomeric residues and consequently their polymer structures, consistent with the finding that oxygenated polymers useful in processes disclosed herein may have polymer structures composed entirely of carbon, hydrogen, and oxygen atoms, or otherwise composed of these atoms and optionally additional atoms such as nitrogen and/or sulfur atoms. The hydrodeoxygenation of oxygenated polymers having nitrogen and/or sulfur atoms, for example, will generally result in the formation of the byproduct gases ammonia ($NH_3$) and hydrogen sulfide ($H_2S$), respectively. These nitrogen and/or sulfur atoms may be part of the chemical structure of the oxygenated polymer (e.g., as in the case of a polyamide) or may otherwise be present as impurities with the oxygenated polymer (e.g., as in the case of organonitrogen or organosulfur impurities). Following downstream processing, these byproduct gases may reside in the gaseous mixture that is separated from the HDO product, provided either in an HDO reactor effluent or in a downstream, supplemental deoxygenation reactor effluent. Such gases, which are derived or generated from nitrogen and/or sulfur heteroatoms (as conversion products of these heteroatoms), if detrimental to further processing steps such as reforming, may be removed from the gaseous mixture (e.g., by contacting with a scrubber solution or adsorbent). Optionally such removal of $NH_3$ and/or $H_2S$ byproduct gases may be accompanied by their utilization in obtaining elemental sulfur or aqueous ammonium hydroxide, or by their reaction in obtaining ammonium sulfide.

Representative oxygenated plastics have an oxygen content of at least 10% by weight (e.g., in the range from about 10 to about 45% by weight). In the case of oxygenated polymers such as PET, having a defined structure and corresponding monomeric residues, the oxygen content can be determined in the same manner described above with respect to the determination of its carbon content. In the case of oxygenated polymers such as lignin, cellulose, and hemicellulose having varying types of monomeric residues, the oxygen content may vary depending on the specific source of these biopolymers and/or any treatments such as used for derivatization. The oxygen content of lignin is typically about 29 wt-%, whereas the oxygen content of the carbohydrates cellulose and hemicellulose is typically about 49 wt-%. As described above, the hydrotreating chemistry according to preferred processes described herein involves all or substantially all hydrodeoxygenation to form water, which may be easily phase separated in a downstream processing section, and specifically using an aqueous-organic phase separation. For example, the yield of oxygen in water obtained from hydrodeoxygenation of one or more oxygenated polymers (calculated in a manner analogous to that of the combined yield of carbon in hydrocarbons) may be at least about 75 wt-%, at least about 85 wt-%, or at least about 95 wt-%. In view of the monomeric residue structure of PET, given above, the weight of oxygen in this monomeric residue, and consequently in the oxygenated polymer itself, is about 33%. Theoretically, therefore, each 100 grams of PET could yield 33 grams of oxygen in water, or about 37 total grams of water. As described above, preferably only minor amounts of oxygen in the oxygenated polymer, for example less than 15%, less than 10%, or even less than 5%, form products other than water, for example CO and $CO_2$.

In some embodiments, oxygenated polymer(s) may be present in mixtures with other plastics and/or non-plastic materials, for example the oxygenated polymer(s) may be present in a mixture of waste plastics that may include other types of polymers such as non-oxygenated polymers (e.g., polyolefins such as polyethylene). Mixtures of waste plastics may be obtained from a wide variety of sources such as a paper mill. Non-plastic materials include biomass-containing materials, such that mixtures may include, for example, municipal solid waste (MSW). In the case of oxygenated polymers being present in mixtures, such other plastics and/or non-plastic materials may be co-processed in the HDO reactor. Optionally, however, the oxygenated polymer(s) may be separated, sorted, and/or otherwise purified to increase its/their content or weight percentage contribution in the mixture, prior to preparing a feed for use in processes disclosed herein. In other embodiments, the oxygenated polymer(s) may be present in a single, uniform or non-uniform composition with other plastics and/or non-plastic materials, such as in the case of a film of the oxygenated polymer in a laminate composition, a polymer blend of the oxygenated polymer, or a fiber reinforced composition. In the case of mixtures of oxygenated polymers, the yields of (i) carbon in hydrocarbons and/or (ii) oxygen in water may be in the ranges described above, based on the overall weight percentages of carbon and oxygen in oxygenated polymers for the given mixture.

Representative Processes, Including Conditions, Products, and Catalysts

Representative processes may comprise preparing a flowable form of the one or more oxygenated polymer(s), optionally present in a mixture and/or single composition as described above. This may include, more particularly, heating, solvating (partially or completely dissolving), and/or partially degrading the oxygenated polymer. Combinations of these, for example a combination of heating and solvating, may be used to prepare a flowable form. According to some embodiments, heating a thermoplastic oxygenated polymer (e.g., above its melting temperature) may be sufficient alone. That is, the flowable form of the oxygenated polymer(s) may be obtained by heating the oxygenated polymer(s) (e.g., at or above its melting temperature, or highest melting temperature in the case of more than a single type of oxygenated polymer), or by both heating the oxygenated polymer(s) and combining the oxygenated polymer(s) with a solvent. In general, preparing a flowable form causes the polymer chains to be freed from close association with one another, allowing them to move independently, such as in certain cases in which the flowable form is a liquid.

Preparing a flowable form may further comprise, as an initial treatment (pre-treatment), separating and/or comminuting the oxygenated polymer(s) to reduce an initial average particle size to a smaller average particle size. Separating may comprise, for example, screening or sieving, optionally in combination with mechanical vibration. Comminuting may comprise, for example, pulverizing, crushing, grinding, cutting, vibrating, or other method. Such separating and/or comminuting may facilitate preparing the flowable form of the oxygenated polymer, by increasing its surface area to volume ratio and thereby, for example, decreasing time for melting and/or solvating. Otherwise, comminuting may provide solid particles of oxygenated polymer(s) having a size such that they may be more easily conveyed in their flowable form, for example in an entraining gas stream (e.g., consisting of or comprising reactant hydrogen). In some embodiments, the oxygenated polymer(s) may be received in a flowable form (e.g., as solid flakes), such that no separate preparation of this form is needed. In other embodiments, the oxygenated polymer(s) (e.g., lignin) need not be in a flowable form, for example in the case of feeding such oxygenated polymer(s) to the HDO reactor as a solid, whereby melting and/or solvating may occur in situ. In this case, the solid may be conveyed to the HDO reactor, for example using solids handling equipment such as lock-hoppers.

In the case of heating, this may be to a temperature generally from about 50° C. (122° F.) to about 400° C. (752° F.), with alternative lower bounds being from about 80° C. (176° F.), from about 125° C. (257° F.), or from about 180° C. (356° F.), and/or with alternative upper bounds being to about 340° C. (644° F.), to about 300° C. (572° F.), or to about 280° C. (536° F.). Representative temperature ranges therefore include, for example, from about 80° C. (176° F.) to about 400° C. (752° F.), from about 80° C. (176° F.) to about 340° C. (644° F.), from about 125° C. (257° F.) to about 400° C. (752° F.), from about 125° C. (257° F.) to about 340° C. (644° F.), and others, as suitable in order to soften, and in many cases completely melt, the oxygenated polymer(s). For example, an oxygenated polymer may be heated to a temperature within a range of about 80° C. (144° F.) below and above its melting temperature, such as within a range from about 170° C. (338° F.) to about 330° C. (626° F.) in the case of PET having a melting temperature of about 250° C. (482° F.), within a range from about 100° C. (212° F.) to about 260° C. (500° F.) in the case of lignin having a melting temperature of about 180° C. (356° F.), or within a range from about 100° C. (212° F.) to about 260° C. (500° F.) in the case of a polyamide such as nylon 6, having a melting temperature of about 180° C. (356° F.). In the case of a mixture of oxygenated polymers, the melting temperature may be that of the oxygenated polymer in the mixture having the highest melting temperature or that of the oxygenated polymer having the highest weight percentage contribution to this mixture.

In the case of solvation, the oxygenated polymer(s) may be partly or completely dissolved in a suitable solvent at a solvent:polymer ratio that reduces the viscosity of the resulting solvent:polymer system, to the extent that such system may be a flowable form. Suitable solvents are liquids at room temperature and may comprise liquid hydrocarbons, such as in the case of a paraffinic oil, for example an oil comprising or consisting of any one or more of $C_8$-$C_{20}$ paraffinic hydrocarbons, such as any one or more of octane, nonane, decane, undecane, dodecane, tridecane, tetradecane, pentadecane, hexadecane, heptadecane, octadecane, nonadecane, and/or icosane, and their isomers. Other solvents may be characterized as an aromatic oil, for example an oil comprising or consisting of any one or more $C_6$-$C_{18}$ aromatic ring-containing hydrocarbons, such as any one or more of benzene, toluene, ethylbenzene, xylenes, and/or naphthalene. Such paraffinic or aromatic oil may be a product of crude oil refining, for example a petroleum fraction such as a diesel boiling-range fraction, vacuum gas oil (VGO), kerosene, or mineral oil. According to particular embodiments, a paraffinic oil may comprise diesel boiling-range hydrocarbons (e.g., may comprise all or substantially all of one or more $C_{12}$-$C_{20}$ aliphatic hydrocarbons), such as in the case of a straight-run diesel fraction obtained from crude oil refining. According to other particular embodiments, an aromatic oil may comprise gasoline boiling-range hydrocarbons (e.g., may comprise all or substantially all of one or more $C_6$-$C_{10}$ aromatic hydrocarbons), such as in the case of a light cycle oil (LCO) obtained from crude oil refining, and more specifically fluid catalytic cracking. Other solvents may comprise or consist of partially or fully hydrogenated, optionally substituted monocyclic or multicyclic hydrocarbons, such as limonene; menthane; camphene; tetralin, optionally substituted at one or more ring positions with methyl, ethyl, propyl, or vinyl; decalin, optionally substituted at one or more ring positions with methyl, ethyl, propyl, or vinyl; cyclopentadiene, optionally substituted at one or more ring positions with methyl, ethyl, propyl, or vinyl; cyclohexadiene, optionally substituted at one or more ring positions with methyl, ethyl, propyl, or vinyl; fluorene, optionally substituted at one or more ring positions with methyl, ethyl, propyl, or vinyl; fluoranthene, optionally substituted at one or more ring positions with methyl, ethyl, propyl, or vinyl; fluorenone, optionally substituted at one or more ring positions with methyl, ethyl, propyl, or vinyl; or acenaphthalene, optionally substituted at one or more ring positions with methyl, ethyl, propyl, or vinyl. The solvent may have the effect of increasing the quantity of diesel boiling-range hydrocarbons and/or gasoline boiling-range hydrocarbons in the HDO product, beyond the yield obtained from conversion of the oxygenated polymer(s) alone.

In other embodiments, the solvent, alternatively to or in conjunction with comprising hydrocarbons, may itself comprise one or more compounds (e.g., oxygenated derivatives of hydrocarbons) that may be converted by hydrodeoxygenation to higher value hydrocarbons, i.e., that may form hydrocarbons in the process. For example, suitable solvents may comprise the same oxygenated compounds that are described above, in terms of being intermediate derivatives of hydrocarbons obtained from hydrodeoxygenation of the oxygenated polymer(s). Solvents may therefore comprise hydroxylated and optionally $C_1$-$C_5$ alkylated benzene derivatives of aromatic hydrocarbons that are obtained from hydrodeoxygenation of the oxygenated polymer, and/or oxygenated derivatives of aliphatic hydrocarbons obtained from hydrodeoxygenation of the oxygenated polymer. Examples of these and other solvents include, particularly in the case of an oxygenated polymer that is a polyester (e.g., PET and/or PEF), phenol, cresols, and bis-2-hydroxyethyl terephthalate, as well as oxygenated furans having as ring substituents one or more of hydroxy, hydroxyalkyl (e.g., hydroxymethyl), carboxy, carboxy ester (e.g., carboxylic acid methyl ester), or aldehyde functional groups. Examples include furfural, 2-(hydroxyacetyl)furan, 2-(acetoxyacetyl)furan, 5-(hydroxymethyl)furfural (HMF), 5-(acetoxymethyl)furfural, 5-(methoxymethyl)furfural, 2,5-diformylfuran, 5-formyl-2-furancarboxylic acid the HMF dimer 5,5'-[oxybis(methylene)]di(2-furaldehyde), as well as HMF oligomers. Other examples of solvents include, particularly in the case of lignin as an oxygenated polymer, 1,4 dioxane, morpholine, morpholine N-oxide, acetic acid, tetrahydrofuran, and lower alcohols (e.g., methanol or ethanol), as well as pyridine.

Other solvents include products of paper manufacturing, such as liquid products (or byproducts) of the kraft or sulfate process for the conversion of wood into pulp. These products, which include black liquor and tall oil, may advantageously be converted by hydrodeoxygenation to higher value hydrocarbons, particularly aromatic hydrocarbons. Tall oil refers to a resinous yellow-black oily liquid, which is namely an acidified byproduct of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction, such as depitched tall oil, that is enriched in the rosin acids, for use as a solvent. Other solvents include naturally or biologically-derived (e.g., non-fossil derived) oils rich in cyclic compounds, including pyrolysis oil, having a high oxygenate content and other properties that render it generally unsuitable for use as a biofuel without deoxygenation.

Representative solvents may comprise predominantly, such as greater than about 50 wt-%, or greater than about 75 wt-%, or greater than about 95 wt-%, of any given compound (e.g., phenol) or given product (e.g., diesel boiling-range hydrocarbons) as described above. Optionally, solvents may be mixtures of any given compound(s), mixtures of any given product(s), or mixtures of any given compound(s) and any given product(s), at suitable mixing ratios, for example in the case of a mixture of tetralin and hexadecane. In such mixtures, any two compounds, any two products, or any product and compound, may be present, for example, in a weight ratio from 1:10 to 10:1, from 1:5 to 5:1, from 1:2 to 2:1, from 1:1.5 to 1.5:1, or from 1:1.25 to 1.25:1 of one mixing component (compound or product) to another mixing component (compound or product). Water may be mixed, to the extent miscible, with any given compound (e.g., such as in the case of a mixture of water and acetic acid) or with any given product (e.g., such as in the case of a mixture of water and pyrolysis oil), at such weight ratio ranges in the case of suitable solvents that are mixtures. These weight ratio ranges may also be characteristic of solvent:polymer ratios described above for reducing the viscosity of a resulting solvent:polymer system, in the case of solvation being used to prepare a flowable form of the oxygenated polymer.

In the case of partially degrading the oxygenated polymer(s) in preparing a flowable form, this may include photolysis; such as by treatment with UV radiation; photo-oxidation; chemical degradation, such as hydrolysis with acids (e.g., in the case of PET) or partial depolymerization with alkalis (e.g., in the case of a polycarbonate); and/or thermal degradation, such as by pyrolysis, hydrogenation, or gasification.

In preferred embodiments, the flowable form of the oxygenated polymer(s) is a liquid form, and preparing the flowable form comprises liquefaction of a solid form of the oxygenated polymer(s) to obtain this liquid form. In this case, advantageously, the flowable (liquid) form may be pumped, as a feed comprising the flowable form, to the HDO reactor. In some cases, liquefaction may be carried out by heating (e.g., to a temperature corresponding to any of the ranges described above), preferably above the melting temperature of at least one, and preferably all, of the one or more oxygenated polymers, and the feed comprising the oxygenated polymer(s) may be conveyed, for example using a feed pump, to the HDO reactor in a molten state. Liquefaction may comprise heating alone, solvation alone (e.g., dissolution of the oxygenated polymer in a solvent as described above), or a combination of both, to obtain a liquid form, which, relative to an initial solid form of the oxygenated polymer, may improve the efficiency of contacting of the oxygenated polymer with the HDO catalyst. Liquefaction may therefore result in the formation of an oxygenated liquid with flow characteristics of an oxygenated oil. Preferably, such flowable form of the oxygenated polymer(s) has a kinematic viscosity, at room temperature or at least at the temperature at which it is pumped, of less than about 3500 centistokes (cst), and preferably less than about 2000 cst, less than about 1000 cst, or less than about 500 cst. The flowable form of the oxygenated polymer may therefore be a completely liquid form as a result of heating and/or solvation. The flowable form may alternatively, however, be a two-phase form such as a suspension of solid particles of oxygenated polymer(s), and possibly a suspension of particles of one or more higher melting temperature polymers (e.g., PET), in a continuous liquid phase of one or more lower melting temperature polymers (e.g., lignin) and/or a solvent as described above. For example, in the case of a suspension, solid particles of one or more oxygenated polymers as described above may be partially suspended and partially dissolved in a solvent as described above, or otherwise completely suspended. Preferably, in the case of a suspension, such flowable form of the oxygenated polymer(s) may nonetheless be conveyed to the HDO reactor using a feed pump (e.g., the solid particles in such suspension may be sufficiently small).

Aspects of the present disclosure exploit advantages associated with the ability to convey and process, by hydrodeoxygenation, a wide variety of fossil fuel-derived and biologically-derived oxygenated polymers, including those present in mixed plastic waste. Hydrodeoxygenation is carried out under conditions present in an HDO reactor, including temperature, total pressure, hydrogen partial pressure, and catalyst type, as well as the configuration of the HDO reactor itself. The particular reactor configuration has the ability to influence a number of important operational parameters, including mixing and temperature control, which impact the efficiency, and overall economic favorability, of converting oxygenated polymer(s) to higher value hydrocarbons. The reactor configuration includes the phases present therein, as well as the position/manner of introducing reactant hydrogen and the feed. A representative HDO reactor is a trickle-bed reactor, in which flows of the feed and reactant hydrogen are downward through a fixed bed of HDO catalyst contained in this reactor. Another example of an HDO reactor is a slurry reactor containing a slurry of the catalyst (or slurry bed), into which the feed and reactant hydrogen may be introduced and mixed (e.g., with continuous mechanical mixing). Regardless of the particular reactor configuration, the reactant hydrogen may comprise fresh or make-up hydrogen only, recycle hydrogen only, or a combination of fresh and recycle hydrogen. Another representative HDO reactor is used for hydroprocessing of hydrocarbons, such as in the case of hydrotreating hydrocarbon-containing feeds to remove nitrogen (N) and/or sulfur (S) heteroatoms and/or hydrocracking these feeds to reduce their molecular weight. The heteroatoms in these feeds are normally present as cyclic organonitrogen and organosulfur compounds such as pyridine, quinoline, thiophene, and benzothiophene. Hydrotreating converts organic nitrogen and sulfur compounds to $NH_3$ and $H_2S$, respectively, such that they may be readily separated in a gas phase, thereby providing a hydrotreated liquid product having reduced nitrogen and sulfur content with a correspondingly reduced potential to yield $NO_x$ and $SO_x$ emissions when used as a combustion fuel. Advantageously, hydrodeoxygenation of oxygenated polymers can be integrated with hydroprocessing of hydrocarbons with the common objectives of (i) removing nitrogen and/or sulfur, and/or (ii) producing hydrocarbons with a desired molecular weight range and corresponding boiling point range, suitable for a given fuel (e.g., gasoline or diesel fuel). In this regard, according to more specific embodiments, the HDO reactor may be a conventional hydrotreating and/or hydrocracking reactor, such as a fixed bed reactor having at least one bed of hydrotreating catalyst and optionally at least one bed of hydrocracking catalyst. Often, reactors employed for hydrotreating and/or hydrocracking of hydrocarbon fractions are trickle-bed reactors.

Hydrodeoxygenation occurs in an HDO reactor (or reactor vessel) containing hydrogen and a solid HDO catalyst. More particularly, hydrodeoxygenation comprises contacting reactant hydrogen and a feed comprising a flowable form of the one or more oxygenated polymers with the HDO catalyst. This contacting occurs in the HDO reactor vessel, which is maintained at (or operated under) suitable HDO conditions which, advantageously, are relatively mild in terms of temperature and hydrogen partial pressure. The flowable form (e.g., melted form) of the oxygenated polymer(s) may serve to improve material and/or heat distribution over the HDO catalyst. The maximum temperature within the HDO reactor, and in some embodiments the average temperature within this reactor, may be less than about 400° C. (752° F.), such as from about 100° C. (212° F.) to about 400° C. (752° F.); less than about 340° C. (644° F.), such as from about 120° C. (248° F.) to about 340° C. (644° F.); less than about 325° C. (617° F.), such as from about 125° C. (257° F.) to about 325° C. (617° F.); less than about 300° C. (572° F.), such as from about 135° C. (275° F.) to about 300° C. (572° F.); less than about 280° C. (536° F.), such as from about 150° C. (302° F.) to about 280° C. (536° F.); or less than about 260° C. (500° F.), such as from about 175° C. (347° F.) to about 260° C. (500° F.). The maximum absolute hydrogen partial pressure within the HDO reactor, and in some embodiments the maximum total absolute pressure within this reactor, may be less than about 65 bar (about 940 psi), such as from about 10 bar (about 145 psi) to about 65 bar (about 940 psi); less than about 55 bar (about 800 psi), such as from about 10 bar (about 145 psi) to about 55 bar (about 800 psi); less than about 45 bar (about 650 psi), such as from about 14 bar (about 200 psi) to about 45 bar (about 650 psi); less than about 35 bar (about 510 psi), such as from about 15 bar (about 220 psi) to about 35 bar (about 510 psi). The weight hourly space velocity (WHSV) in the HDO reactor, calculated as the weight flow rate of the oxygenated polymer(s), divided by the weight of the catalyst inventory in the HDO reactor, is generally from about 0.01 hr$^{-1}$ to about 50 hr$^{-1}$, typically from about 0.1 hr$^{-1}$ to about 10 hr$^{-1}$, and often from about 0.5 hr$^{-1}$ to about 5 hr$^{-1}$. Contacting of the reactant hydrogen and feed comprising the flowable form of the oxygenated polymer(s) provides an HDO product comprising hydrocarbons, which, as described above, have carbon atoms derived from, or that are initially present in, the oxygenated polymer(s).

In general, during the process of producing hydrocarbons from oxygenated polymer(s), namely in the preparation of a feed from the oxygenated polymer(s) and/or during the contacting of the feed with reactant hydrogen, the oxygenated polymer(s) and/or feed is/are maintained below a temperature at which the oxygenated polymer(s) thermally decompose (by thermolysis). For example, a given oxygenated polymer may be maintained at least about 10° C. (18° F.) or at least about 20° C. (36° F.) below its thermolysis temperature. In the case of a mixture of oxygenated polymers, the thermolysis temperature may be that of the oxygenated polymer in the mixture having the lowest thermolysis temperature or that of the oxygenated polymer having the highest weight percentage contribution to this mixture. With respect to the preparation stage for preparing a flowable form of the oxygenated polymer, for example in the case of using a hydrocarbon-containing solvent (e.g., as a hydrocarbon-containing feed to the HDO reactor) or other solvent of the oxygenated polymer, advantages reside in exploiting the difference between the melting temperature and the thermal decomposition temperature of the oxygenated polymer. In this regard, it has been found that, in this temperature range, oxygenated polymers can be separated in an efficient manner from other materials (e.g., insoluble solids such as metals and other wastes, including other inorganic materials), on the basis of solubility differences.

Accordingly, in representative processes, the preparation of the flowable form of the oxygenated polymer may comprise solvating (partially or completely dissolving) the oxygenated polymer by combining it with a solvent (e.g., a paraffinic or aromatic oil) and, at a temperature between the melting temperature and the thermal decomposition temperature of the oxygenated polymer, filtering the solvated, oxygenated polymer to separate impurities such as solids existing under the heated, solvated condition of the oxygenated polymer. For example, in the case of PET, or otherwise mixed plastic waste or other material mixture of which PET is a primary component, or has the highest weight percentage contribution, the preparation of a flowable form of the oxygenated polymer may comprise filtering the PET, mixed plastic waste, or other mixture following solvation, at a temperature from about 250° C. (482° F.) to about 350° C. (662° F.), such as from about 260° C. (500° F.) to about 290° C. (554° F.) or from about 275° C. (527° F.) to about 325° C. (617° F.). In the case of lignin, or otherwise mixed plastic waste or other material mixture of which lignin is a primary component, or has the highest weight percentage contribution, the preparation of a flowable form of the oxygenated polymer may comprise filtering the lignin, mixed plastic waste, or other mixture following solvation, at a temperature from about 150° C. (302° F.) to about 300° C. (572° F.), such as from about 200° C. (392° F.) to about 275° C. (527° F.). In the case of a polyamide (e.g., nylon 6), or otherwise mixed plastic waste or other material mixture of which a polyamide is a primary component, or has the highest weight percentage contribution, the preparation of a flowable form of the oxygenated polymer may comprise filtering the polyamide, mixed plastic waste, or other mixture following solvation, at a temperature from about 160° C. (320° F.) to about 400° C. (752° F.), such as from about 180° C. (356° F.) to about 300° C. (572° F.) or from about 200° C. (392° F.) to about 250° C. (482° F.).

Despite the possibility for the feed to comprise solid particles (e.g., in cases, as described above, of a flowable form of solid particles of oxygenated polymer(s), or of a suspension of oxygenated polymer(s)), preferably no, or substantially no, solids are present in the feed or are otherwise introduced to the HDO reactor. Whether or not any solids (including any catalyst) are added to the HDO reactor, preferably the feed comprising the flowable form of the oxygenated polymer accounts for the majority (greater than about 50 wt-%) of any non-gaseous (liquid and/or solid) components added to the HDO reactor. For example, the feed may account for greater than about 90 wt-% of non-gaseous components. In representative embodiments, the feed, or optionally all components (e.g., the feed, reactant hydrogen, and any catalyst) added to the HDO reactor has a solids content, based on the weight of the feed, or optionally based on the weight of all components, of less than about 10 wt-%, less than about 5 wt-%, or even less than about wt-%. In other representative embodiments, the yield of solids from hydrodeoxygenation, based on the weight of the feed, the weight of the HDO product, or optionally the weight of the HDO reactor effluent, is less than about 5 wt-%, less than about 3 wt-%, or even less than about 0.5 wt-%. Representative processes are therefore advantageous over conventional practices of polymer conversion based on pyrolysis and gasification, in that normally no solid residues, such as char, are produced.

The HDO product, comprising hydrocarbons having carbon atoms initially present in (derived from) the oxygenated polymer, may be separated from an HDO reactor effluent, or at least a portion thereof, i.e., the HDO product may be a component of this effluent. A second component of this effluent, or possibly a second, separate HDO reactor effluent, may be a gaseous mixture comprising hydrogen and non-condensable hydrocarbons, as well as other non-condensable gases, and possibly condensable hydrocarbons. For example, the gaseous mixture may comprise $H_2$, CO, $CO_2$, $CH_4$, $C_2H_6$, and/or $C_3H_8$. To the extent that the flowable form of the oxygenated polymer, including the oxygenated polymer itself and/or any solvent used to prepare the flowable form, has nitrogen (N) or sulfur (S) heteroatoms present in its chemical composition, or otherwise present as impurities, conversion in the HDO reactor will generally result in the formation of ammonia ($NH_3$) and hydrogen sulfide ($H_2S$) from these heteroatoms, respectively. Accordingly, the gaseous mixture in such cases may further comprise one or both of these gases.

In some embodiments, the HDO product and gaseous mixture, if present together in the HDO reactor effluent, may be phase separated (according to a vapor-liquid phase separation), following cooling of this effluent. In addition, an aqueous product, comprising water generated from hydrodeoxygenation, and more particularly having oxygen atoms initially present in (derived from) the oxygenated polymer, may be phase separated from the HDO product (according to an aqueous-organic phase separation). Such aqueous product may therefore be a further component of the HDO reactor effluent. In some embodiments, the HDO reactor effluent may comprise a partially deoxygenated intermediate as described above, having oxygenated compounds (intermediate derivatives), optionally in combination with hydrocarbons. In this case, the partially deoxygenated intermediate may be further deoxygenated to hydrocarbons in an optional, supplemental deoxygenation reactor. The process may then further comprise withdrawing an effluent from this reactor, and separating the HDO product from the effluent of this reactor, and optionally separating other components as described above. Accordingly, the HDO product may be provided following further deoxygenating, for example in a supplemental deoxygenation reactor that affords a separate contacting step of the HDO reactor effluent with hydrogen and catalyst, to further deoxygenate a partially deoxygenated intermediate. Such intermediate comprises oxygenated hydrocarbons, which may otherwise be characterized as hydrocarbon precursors.

As another alternative, the HDO product may be provided following hydrocracking, such that the process may comprise withdrawing an effluent of a downstream hydrocracking zone (e.g., contained within the HDO reactor), or separate hydrocracking reactor, and separating the HDO product from the effluent of this reactor, and optionally separating other components as described above. In the case of a separate hydrocracking reactor, this may be downstream of a supplemental deoxygenation reactor, as described above, which may, in turn, be downstream of the HDO reactor. Otherwise, if no supplemental deoxygenation reactor is utilized, the separate hydrocracking reactor may be directly downstream of the HDO reactor, i.e., may directly process at least a portion of the effluent withdrawn from this reactor. In any event, a hydrocracking zone or separate hydrocracking reactor may be utilized to perform cracking of hydrocarbons that are molecular sub-units derived from the oxygenated polymer. In a more particular case of integration of oxygenated polymer hydrodeoxygenation with the hydrocracking of hydrocarbons from sources other than the oxygenated polymer, such hydrocracking zone or separate hydrocracking reactor may be utilized to perform simultaneous cracking of (i) such hydrocarbons, which may be present in a hydrocarbon fraction (e.g., obtained from crude oil refining, such as a diesel boiling-range hydrocarbon fraction or VGO) with (ii) hydrocarbons obtained as molecular sub-units from deoxygenation of the oxygenated polymer.

Various liquid products may be obtained as fractions of the HDO product (e.g., by fractional distillation). Such liquid products, as well as the HDO product itself, to the extent that they have a greater value (e.g., on a weight basis) than the oxygenated polymer or feed comprising a flowable form of this polymer, may be referred to as "higher value liquids," generated from the HDO process. Representative higher value liquids include individual compounds (e.g., para-xylene), classes of compounds (e.g., aromatic hydrocarbons), and mixtures of compounds suitable for a particular purpose (e.g., gasoline, diesel, or jet fuel boiling-range hydrocarbons suitable for use as transportation fuels or otherwise for blending into such fuels).

Suitable catalysts for use in the HDO reactor have activity for hydrodeoxygenation of the oxygenated polymer in an environment of suitable hydrogen partial pressure, temperature, and other conditions as described herein. Advantageously, such catalysts and conditions avoid problems that may be encountered under more severe operating environments (e.g., higher temperatures and/or pressures) that not only result in added operating and equipment costs, but also in the formation of unwanted byproducts, such as through condensation and elimination reactions. These byproducts reduce liquid hydrocarbon yields and increase catalyst deactivation through coking. Importantly, processes described herein are tailored to promote selective hydrodeoxygenation chemistry (e.g., almost exclusively), by targeting this chemistry, according to the ease at which it is performed relative to other, undesired chemistry. For selectively carrying out simple and rapid oxygen removal from oxygenated polymer molecules while suppressing catalyst coking, generally mild conditions in terms of hydrogen partial pressure and/or temperature are sufficient. These milder conditions and the resulting improvements obtained in terms of reaction selectivity, contribute to favorable economics as needed for commercial scale operations.

Representative HDO catalysts include those comprising one or more metals of Groups 6-13 of the Periodic Table (IUPAC), and preferably one or more metals selected from the group consisting of nickel, cobalt, molybdenum, and gallium. According to other embodiments, the desired HDO chemistry may be catalyzed by an active noble metal-containing catalyst to ensure a high degree of conversion by hydrotreating (specifically hydrodeoxygenation) under relatively mild temperatures and hydrogen partial pressures as described herein. Other representative catalysts may therefore comprise one or more metals selected from the group consisting of platinum, rhodium, ruthenium, palladium, silver, osmium, iridium, and gold. For example, catalysts comprising one or more of platinum, palladium, and/or rhodium may be used. Any of the above metals may be present in the catalyst in an amount, individually or in combination, from about 0.05 wt-% to about 12 wt-%, from about 0.1 wt-% to about 10 wt-%, from about 0.5 wt-% to about 8 wt-%, or from about 1 wt-% to about 5 wt-%, based on the weight of the catalyst. For example, in the case of a noble metal-containing catalyst, such catalyst may comprise one or any two or more of Pt, Pd, Rh, which may independently be present in an amount within any of the above ranges (e.g., from about 0.5 wt-% to about 8 wt-%), or otherwise the one or any two or more of Pt, Pd, and Rh may be present in a combined amount within any of the above ranges. The one or more metals as described above may be present in various forms (i.e., in various compounds), such as the sulfide form, oxide form, nitride form, carbide form, and/or phosphide form, having corresponding, various oxidation states that may be either an oxidized state or reduced state. The one or more metals may also be present in their elemental (zero oxidation state) form. Particular types of HDO catalysts comprise one or more metals as described above, having catalytic activity for carrying out hydrodeoxygenation under conditions described herein, in its/their sulfided form. Specific examples are catalysts comprising cobalt and molybdenum (CoMo) that are sulfided, as well as catalysts comprising nickel and molybdenum (NiMo) that are sulfided. Sulfided metal forms may be obtained, or maintained, by subjecting catalysts to a sulfiding agent such as $H_2S$ (e.g., during operation or in situ).

In addition to any of the above metals or combinations of metals, representative HDO catalysts may comprise a solid support, onto which the metal(s) are deposited and/or within which the metal(s) are dispersed. The solid support may be present as the balance, or substantially the balance, of the total catalyst weight, including the weight of the metal(s). In particular embodiments, the one or more metals described above, such as one or more metals of Groups 6-13 (e.g., one or more noble metals), in combination with the solid support, may represent at least about 90 wt-%, at least about 95 wt-%, or at least about 99 wt-%, of the catalyst weight. The solid support may comprise one or more refractory inorganic metal oxides, examples of which are silica, alumina, titania, ceria, zirconia, magnesium oxide, calcium oxide, and strontium oxide. Alternatively, or in combination, the support may comprise one or more zeolites, examples of which are zeolite X, zeolite Y, or zeolite beta. Alternatively, or in combination, the support may comprise a carbonaceous material, such as porous activated carbon. In view of the above description, various possibilities for catalyst compositions include (i) any one or more metals of Groups 6-13, with such metal(s) being present individually and/or such metal(s) being present in a combined amount, within any of the ranges described above (e.g., from about 0.1 wt-% to about 10 wt-%) and (ii) any one or more solid support materials (e.g., silica, alumina, or silica and alumina in combination) being present individually or in combination, in an amount representing the balance, or substantially the balance, of the total catalyst weight. Catalytically active metals, including any of those described above that may be present in the catalyst, are normally present on and/or within the support as fine particles of metal and/or of a metal compound (e.g., in any of the forms described above). Such discreet particles may, for example, have an average size in the range generally from about 0.1 nanometers (nm) to about 500 nm, such as from about 0.3 nm to about 200 nm, from about 0.5 nm to about 100 nm, or from about 1 nm to about 50 nm. Exemplary HDO catalysts comprise at least one Group 6 metal and at least one Group 8 metal, supported on an inorganic refractory metal oxide, a zeolite, or porous activated carbon.

The one or more metals may be incorporated in the solid support according to known techniques for catalyst preparation, including sublimation, impregnation, or dry mixing. In the case of impregnation, which is a preferred technique, an impregnation solution comprising one or more soluble compounds of the respective one or more metals in a polar (aqueous) or non-polar (e.g., organic) solvent may be contacted with the solid support, preferably under an inert atmosphere. For example, this contacting may be carried out, preferably with stirring, in a surrounding atmosphere of nitrogen, argon, and/or helium, or otherwise in a non-inert atmosphere, such as air. The solvent may then be evaporated from the solid support, for example using heating, flowing gas, and/or vacuum conditions, leaving the dried, metal-impregnated support. In the case of HDO catalysts comprising more than one metal, these may be impregnated in the solid support simultaneously by being dissolved in the same impregnation solution, or otherwise separately using different impregnation solutions and contacting steps. In any event, the resulting metal-impregnated support may be subjected to further preparation steps, such as washing with water or other suitable agent to remove excess metal(s) and impurities, further drying, calcination, etc. to provide the HDO catalyst.

The solid support itself may be prepared according to known methods, such as extrusion to form cylindrical particles (extrudates) or oil dropping or spray drying to form spherical particles. Regardless of the specific shape of the solid support and resulting catalyst particles, the amounts of metal(s) being present in the catalyst, as described above, refer to the weight of such metal(s), on average, in a given catalyst particle (e.g., of any shape such as cylindrical or spherical), independent of the particular distribution of the metal(s) within the particle. In this regard, it can be appreciated that different preparation methods can provide different distributions, such as deposition of the metal(s) primarily on or near the surface of the solid support or uniform distribution of the metal(s) throughout the solid support. In general, weight percentages described herein, being based on the weight of the catalyst, can refer to weight percentages in a single catalyst particle but more typically refer to average weight percentages over a large number of catalyst particles, such as the number in a reactor that form a fixed catalyst bed or a slurry bed in processes described herein. In the case of a fixed bed (e.g., a trickle-bed), particles of HDO catalyst, if spherical, may have an average diameter, for example, in the range generally from about 1 mm to about 10 mm, typically from about 1 mm to about 5 mm, and often from about 1 mm to about 3 mm. Particles having other geometries, and also suitable for use in a fixed bed, include cylindrical catalyst particles (e.g., when prepared by extrusion). If cylindrical, particles of HDO catalyst may have an average diameter within any of the ranges for diameter described above, with respect to spherical catalysts. For example, extrudates may be formed having diameters of 1.59 mm (1/16 inch), 3.18 mm (1/8 inch), or 6.35 mm (1/4 inch). Cylindrical catalyst particles may also have an average length generally from about 1 mm to about 10 mm, typically from about 1 mm to about 5 mm, and often from about 1 mm to about 3 mm. Alternatively, particles of HDO catalysts may have average particle sizes suitable for slurry bed operation, for example in the range generally from about 0.01 mm to 2 mm and typically from about 0.05 mm to about 1 mm, with the average particle size being governed by tradeoffs between reduced mass transfer limitations with increasing size and reduced filterability with decreasing size.

If a supplemental deoxygenation reactor is used for further deoxygenation of a partially deoxygenated intermediate as described above, this reactor may contain a catalyst having a composition, as described above for use in the upstream HDO reactor, including catalytically active metals (e.g., one or more metals of Groups 6-13 of the Periodic Table, such as CoMo or NiMo), solid supports, and their weight percentages. In general, a supplemental deoxygenation reactor may contain a fixed bed of catalyst, and therefore catalyst particles in this fixed bed may, for example, be spherical or cylindrical with dimensions as described above. If a hydrocracking catalyst is utilized according to any of the embodiments described herein, for example in a hydrocracking zone that is contained within the HDO reactor (e.g., as a separate bed of catalyst disposed in this reactor, downstream of the HDO catalyst), or that is present in a separate reactor (e.g., downstream of the HDO reactor or downstream of a supplemental deoxygenation reactor), such hydrocracking catalyst may have a composition as described above for use in the upstream HDO reactor, including those catalytically active metals (e.g., one or more metals of Groups 6-13 of the Periodic Table, such as CoMo or NiMo), solid supports, and their weight percentages. According to particular embodiments, a solid support for a hydrocracking catalyst may have greater acidity (e.g., in terms of acid site concentration and/or strength), relative to a solid support for an HDO catalyst and/or a catalyst used in a supplemental deoxygenation reactor, as support acidity can impact the ability of a given catalyst to promote cracking. For example, a support for a hydrocracking catalyst may comprise, or consist of, a zeolite, with acidity of the zeolite being a function of its silica to alumina ($SiO_2/Al_2O_3$) molar framework ratio. Sufficient acidity of a support for a hydrocracking catalyst may, for example, be obtained in the case of such support comprising, or consisting of, a zeolite having a silica to alumina ($SiO_2/Al_2O_3$) molar framework ratio of less than about 60 (e.g., from about 1 to about 60), or less than about 40 (e.g., from about 5 to about 40). Particular solid supports for hydrocracking catalysts may comprise, or consist of, one or more zeolites having a structure type selected from the group consisting of FAU, FER, MEL, MTW, MWW, MOR, BEA, LTL, MFI, LTA, EMT, ERI, MAZ, MEI, and TON, and preferably selected from one or more of FAU, FER, MWW, MOR, BEA, LTL, and MFI. The structures of zeolites having these and other structure types are described, and further references are provided, in Meier, W. M, et al., *Atlas of Zeolite Structure Types*, 4th Ed., Elsevier: Boston (1996). Specific examples include mordenite (MOR structure), zeolite Y (FAU structure), zeolite X (FAU structure), MCM-22 (MWW structure), and ZSM-5 (MFI structure), with ZSM-5 being exemplary. Amorphous silica-alumina may also serve as a suitable support. The particular zeolites described above, as well as amorphous silica-alumina, may also be used as a solid support for representative HDO catalysts and/or a catalysts used in a supplemental deoxygenation reactor, in the representative weight percentages described above with respect to HDO catalysts.

Particular Processes, Integrating polymer Deoxygenation with Hydroprocessing

According to particular embodiments, processes described herein for the deoxygenation of oxygenated polymers may be integrated with hydroprocessing to upgrade hydrocarbon fractions, with a number of potential advantages arising from such integration, including those associated with the shared use of equipment and utilities. Such embodiments may utilize any of the feeds, catalysts, reactor types, and conditions described above with respect to the processes for the hydrodeoxygenation of oxygenated polymers generally. Process integration can refer to any process for the hydrodeoxygenation of oxygenated polymers described herein, in which a solvent of the oxygenated polymer is itself upgraded by reactions occurring in the HDO reactor.

In the particular case of integration of the hydrodeoxygenation of oxygenated polymers with the hydroprocessing of hydrocarbons, a feed to such integrated process may comprise both (i) a flowable form of the oxygenated polymer and (ii) a hydrocarbon fraction (as a type of hydrocarbon-containing feed), all or a portion of which may be utilized as a solvent to provide (i). An HDO product of such integrated process may comprise hydrocarbons obtained as conversion products of both (i) and (ii). For example, hydrocarbons of the MO product may be obtained (i) as molecular sub-units of the oxygenated polymer, and/or cracked products of such molecular sub-units, having a reduced molecular weight, and (ii) as denitrogenated or desulfurized hydrocarbons of the hydrocarbon fraction, and/or cracked products of such denitrogenated or desulfurized hydrocarbons, having a reduced molecular weight. Cracked products result in the case of integration with hydrocracking as a particular hydroprocessing operation. The integration of the hydrodeoxygenation of oxygenated polymers with the hydroprocessing of hydrocarbons can further result in the formation of $NH_3$ from nitrogen atoms initially present in the oxygenated polymer and in the hydrocarbon fraction, and/or the formation of $H_2S$ from sulfur atoms initially present in the oxygenated polymer and in the hydrocarbon fraction. For example, $NH_3$ and/or $H_2S$, derived from both the oxygenated polymer and the hydrocarbon fraction, may be obtained in a gaseous mixture in representative processes described herein, and optionally removed from such gaseous mixture if otherwise detrimental to downstream processing operations or for environmental reasons.

According to further advantages obtained from the integration of oxygenated polymer hydrodeoxygenation with hydrocarbon hydroprocessing, a solvent used in preparing a flowable form of the oxygenated polymer (e.g., as a first component of the feed) may be, or may comprise, all or a portion of the hydrocarbon fraction (e.g., as a second component of the feed). In the case of using the HDO reactor for the dual purpose of (i) hydrodeoxygenation of a flowable form of the oxygenated polymer and (ii) hydroprocessing of a hydrocarbon fraction, such fraction may benefit from removal nitrogen (N) and/or sulfur (S) heteroatoms, if the hydroprocessing operation is hydrotreating, and/or from a reduction in molecular weight, if the hydroprocessing operation is hydrocracking, optionally in combination with hydrotreating. For example, a diesel boiling range hydrocarbon fraction, such as straight-run diesel fraction obtained from crude oil fractionation, may be used a solvent in preparing a flowable form of the oxygenated polymer, in the case of using the HBO reactor for the dual purpose of hydrodeoxygenation of the flowable form of the oxygenated polymer and hydrotreating of the diesel boiling range hydrocarbon fraction. As another example, a higher molecular weight range hydrocarbon fraction (relative to a diesel boiling-range fraction), such as vacuum gas oil (VGO) obtained from crude oil fractionation, may be used a solvent in preparing a flowable form of the oxygenated polymer, in the case of using the MO reactor for the dual purpose of hydrodeoxygenation of the flowable form of the oxygenated polymer and hydrocracking of the higher molecular weight fraction, optionally in combination with hydrotreating (e.g., upstream of the hydrocracking, in a separate catalyst bed or even a separate reactor).

In this manner, the hydroprocessing of the solvent through the HBO reactor, whether such hydroprocessing comprises hydrotreating, hydrocracking, or a combination of these, may contribute to the amount (or add to the yield) of hydrocarbons of the same types in the HDO product that are desired conversion products of the oxygenated polymer. For example, hydroprocessing of the solvent may contribute to the amount of diesel boiling-range hydrocarbons, gasoline boiling range hydrocarbons, and/or either of such hydrocarbon types meeting a specific total sulfur and/or nitrogen specification (such as in the case of low sulfur diesel), otherwise obtained from hydrodeoxygenation of the oxygenated polymer alone. Unconverted solvent, which may be present as a portion of the HBO reactor effluent (e.g., hydrocarbons in the HDO reactor effluent that are characteristic of those present the solvent, such as present in VGO), may be separated from this effluent according to various separation techniques, including those based on relative volatility, such as by a crude separation stage (e.g., a vapor-liquid separation section) and/or by a refined separation stage (e.g., a product fractionation section). Separation of unconverted solvent, or of any portion of the HDO reactor effluent in general, allows for its recycle, for example to a preparation stage used for preparing the flowable form of the oxygenated polymer. Representative processes involving integration with hydroprocessing may therefore include a solvent recycle loop, optionally with the addition of make-up solvent to any point(s) of this loop, for example to the preparation stage, an inlet (a suction side) of a feed pump, or an inlet of the HBO reactor.

Related aspects are associated with the integration of a hydroprocessing process or apparatus, such as a hydrotreating or hydrocracking process or facility (plant), with a step of preparing a flowable form of an oxygenated polymer as described herein. In such process integration, a feed component (e.g., a second feed component) that is upgraded in the hydroprocessing process or apparatus advantageously provides a solvent for preparing the flowable form of the oxygenated polymer as another feed component (e.g., a first feed component). The hydroprocessing process may be conventional, such as a conventional diesel hydrotreating process or a conventional VGO hydrocracking process, which conventional process can benefit from the added step of preparing a flowable form of an oxygenated polymer, together with processing to yield additional hydrocarbons, including those of the same type (e.g., within a desired boiling point range) obtained from processing of the second feed component as described above. Such second feed component may be a hydrocarbon fraction such as straight-run diesel or GO that in conventional processes would benefit by hydrotreating or hydrocracking when used as a feed alone (or in the absence of the flowable form of the oxygenated polymer). According to aspects of the invention, the co-feeding of the flowable form of the oxygenated polymer with such hydrocarbon fraction provides advantages in terms of process integration, including the use of the hydrocarbon fraction as a solvent, increased product yields, and common usage of facilities and associated equipment.

Further related aspects are associated with methods for modifying a hydrotreating or hydrocracking process or facility (plant), such as a facility that is under-utilized or decommissioned. Such facility may comprise a hydrotreating and/or hydrocracking reactor configured to receive hydrogen and a hydrocarbon fraction, in addition to a product fractionation section, as a refined separation stage, configured to fractionate an effluent of the hydrotreating and/or hydrocracking reactor into product fractions (e.g., a gasoline boiling-range fraction and/or a diesel boiling-range fraction). Representative methods may comprise retrofitting the facility with a connection from an existing inlet of the reactor, or from an added inlet of the reactor, to an upstream preparation stage for preparing a flowable form of an oxygenated polymer as described herein. Such modification methods may render the resulting, modified process and/or its operation profitable, or at least improve the overall economics of the resulting, modified process and/or its operation, due to benefits associated with co-processing and process integration, as described herein. These particular aspects of the invention advantageously allow for the conversion of plastic to higher value hydrocarbons using, for example, existing refinery equipment that is adapted for co-processing according to a simple and low-cost approach.

EXEMPLARY EMBODIMENTS

FIG. 1 depicts one possible, non-limiting process for carrying out hydrodeoxygenation. The process comprises a preparation stage 100 for preparing a flowable form of oxygenated polymer 10, as described above. For example, preparation stage 100 may involve liquefaction, in which oxygenated polymer 10 is melted and/or optionally combined with solvent feed 12 that is a solvent as described above. Preparation stage 100 may also include the separation of impurities 15, such as by filtering solids from the oxygenated polymer in its flowable form, which solids are initially present in oxygenated polymer 10, for example in the case of a waste plastic mixture containing this polymer. Preparation stage allows for the continuous supply, using feed pump 50, of feed 14 comprising the flowable form of oxygenated polymer 10 to hydrodeoxygenation (HDO) reactor 200. The process may therefore comprise contacting this feed 14 and reactant hydrogen 16 with a catalyst in HDO reactor 200, under conditions of temperature, hydrogen partial pressure, and total pressure as described above, for example with this reactor having a trickle-bed reactor configuration. In such configuration of HDO reactor 200, both feed 14 and reactant hydrogen 16, together with any recycle hydrogen 18, are passed downwardly through fixed bed 250' of particles of an HDO catalyst as described herein. The process then further comprises withdrawing an effluent from this reactor, with this HDO reactor effluent 20 comprising an HDO product and other components as described herein, such as a gaseous mixture and an aqueous product. According to the embodiment of FIG. 1, feed 14 and reactant hydrogen 16 may be introduced at separate locations of HDO reactor 200, such as at separate locations at or near an upper inlet end of this reactor. Otherwise, one or both of feed 14 and reactant hydrogen 16 may be introduced at an axial location that is removed or spaced apart from the upper inlet end. According to other embodiments, one or both of feed 14 and reactant hydrogen 16 may be introduced at multiple different axial locations (e.g., multiple axial heights of HDO reactor 200, corresponding to axial heights within and/or outside of, fixed bed 250' of particles of an HDO catalyst), for example to achieve desired temperature control, mixing effects, localized gas velocities, and/or uniformity of consumption of hydrogen. It is also possible for feed 14 and reactant hydrogen 16 to be combined upstream of HDO reactor 200, with the introduction of this combined feed at or near an upper inlet of HDO reactor 200, and/or at multiple different axial locations.

HDO reactor 200 promotes intimate contacting of feed 14 in its flowable form (e.g., melted, and optionally solvated) with a highly active and selective HDO catalyst as described herein, at exemplary reactor temperatures as also described herein, such as from about 100° C. (212° F.) to about 400° C. (752° F.). Oxygenated plastic in feed 14 then undergoes primarily hydrodeoxygenation chemistry, such that oxygen is removed and incorporated into $H_2O$ (water) molecules. Heteroatoms such as nitrogen and others may also generally be removed via simple hydrotreating reactions, such as the conversion of nitrogen in the oxygenated plastic (e.g., in the case of a polyamide) to gaseous ammonia. On the other hand, side reactions that would promote coking under more severe operating conditions (e.g., at higher reaction temperatures), such as condensation and elimination (pyrolysis) reactions, are substantially avoided. The selective severing of oxygen bonds within the oxygenated polymer results in the generation of deoxygenated (or partially deoxygenated) molecular sub-units, as described above. Depending on the particular oxygenated polymer, these deoxygenated molecular sub-units may include, predominantly on a weight basis, condensable hydrocarbons including $C_5^+$ paraffins, benzene, toluene, mixed xylenes (ortho-xylene, meta-xylene, and para-xylene), and/or ethylbenzene. The HDO product, as a component of HDO reactor effluent 20, may comprise such condensable hydrocarbons. Other molecular sub-units include lower molecular weight hydrocarbons such as methane, ethane, and/or propane. Whereas olefinic hydrocarbons may also result from hydrodeoxygenation, these will generally become saturated under conditions of elevated hydrogen partial pressure within HDO reactor 200.

Figure 2:
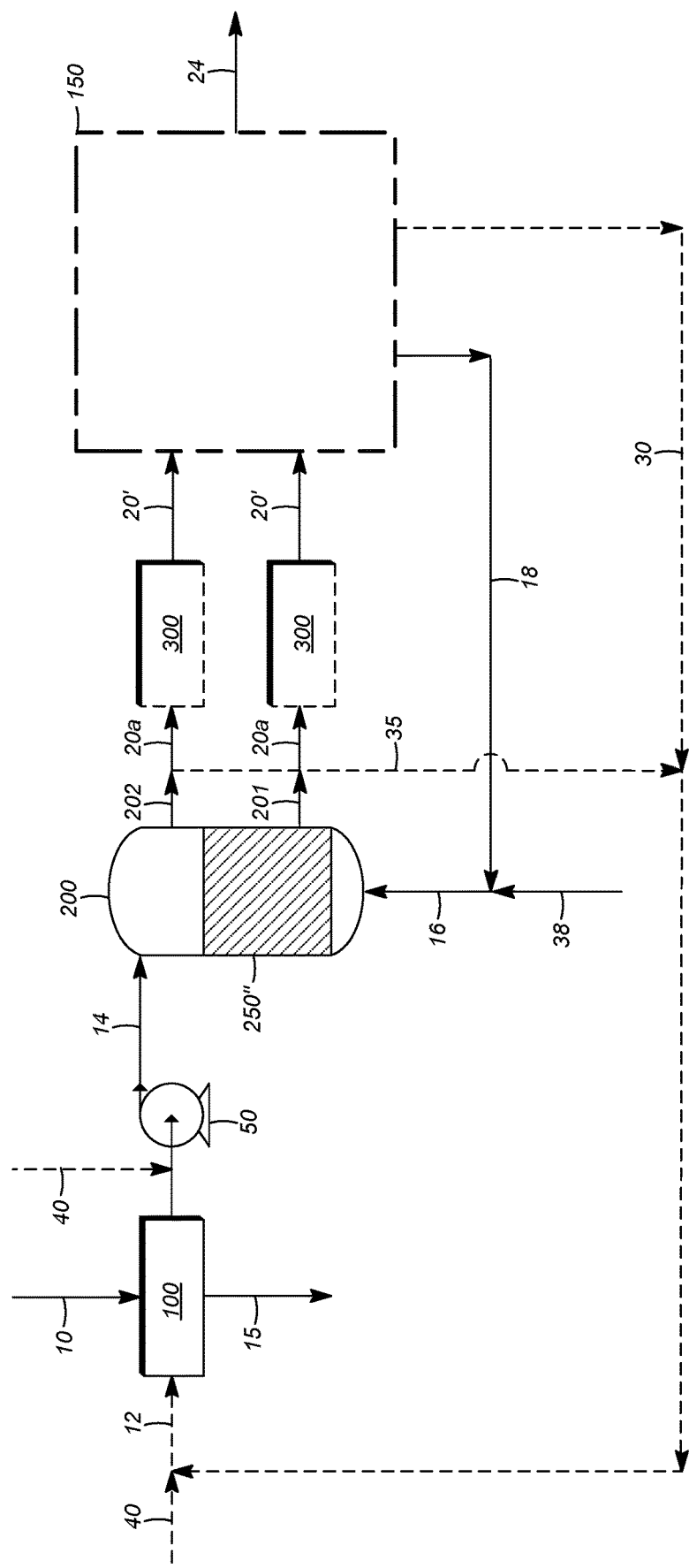
FIG. 2 is a schematic flow diagram of an alternative process, in which the flow of the hydrogen-containing gas (reactant hydrogen) is directed upwardly through the reactor, such as in the case of a slurry reactor.

The same characteristics (operating conditions and chemistry) described with respect to HDO reactor 200 having a trickle-bed reactor configuration and containing fixed bed 250' of HDO catalyst particles as illustrated in FIG. 1, may likewise be associated with this reactor 200 as illustrated in FIG. 2, having a slurry reactor configuration and containing slurry bed 250" of HDO catalyst particles. In the case of a slurry reactor configuration, generally finer catalyst particles (e.g., having an average particle size within a range as described above) are suspended in a liquid reaction medium. This may comprise the flowable form of the oxygenated polymer, including any solvent, in addition to water and a liquid portion of the HDO product residing in the reactor (portion of the HDO product that is liquid under the HDO conditions).

As described above, and with further reference to FIG. 1, HDO reactor effluent 20 may comprise a partially deoxygenated intermediate, referring to oxygenated compounds having the potential to yield additional hydrocarbons through further deoxygenation. In this case, obtaining or recovering the HDO product may comprise further deoxygenating this intermediate in optional supplemental deoxygenation reactor 300, withdrawing supplemental deoxygenation reactor effluent 20', and separating the HDO product from this effluent. Otherwise, whether or not HDO reactor effluent 20 comprises a partially deoxygenated intermediate, the process may comprise obtaining the HDO product comprising hydrocarbons, directly from the HDO reactor effluent 20, following withdrawing this effluent from HDO reactor 200. In either case, whether recovered from HDO reactor effluent 20 or from supplemental deoxygenation reactor effluent 20', HDO product 24 may be separated from such effluent, as well as other of its components, using any number of separation steps, including those shown in downstream processing section 150 in FIG. 1. In cases in which solvent is used in preparation stage 100, recycle portion 35 of effluent 20, comprising solvent, may be separated and recycled to preparation stage 100. For example, recycle portion may be combined with make-up solvent 40 to provide solvent feed 12. If supplemental deoxygenation reactor 300 is used, a portion of reactant hydrogen 16 may be added directly to this reactor (not shown in FIG. 1), as opposed to being added entirely to HDO reactor 200. Suitable portions of reactant hydrogen 16 for this purpose may include, more specifically, a portion of recycle hydrogen 18 and/or a portion of make-up hydrogen 38.

According to embodiments of the invention, at least a portion of HDO reactor effluent 20, such as portion 20a remaining following the separation of recycle portion 35, may be subjected to further deoxygenating in optional supplemental deoxygenation reactor 300, or may otherwise be passed directly to downstream processing section 150 to obtain HDO product 24. In addition, recycle portion 35 may be enriched in (have a higher concentration of) solvent, relative to HDO reactor effluent 20, for example by using separation techniques based on relative volatility differences (e.g., distillation), solubility differences (e.g., extraction), or other differences. In such cases, portion 20a of HDO reactor effluent may be depleted in (have a lower concentration of) solvent, relative to HDO reactor effluent 20. Otherwise, recycle portion 35 may have the same or substantially the same composition, including concentration of solvent, relative to both HDO reactor effluent 20 and portion 20a, for example in the case of simply splitting off recycle portion 35 from HDO reactor effluent 20.

In one non-limiting embodiment, downstream processing section 150 may include various steps and associated equipment for processing of effluent 20 or at least a portion thereof, or optionally cool supplemental deoxygenation reactor effluent 20' or at least a portion thereof. For example, such effluent 20, 20' or respective portion thereof may be introduced to effluent cooler 350. This condenses HDO product 24 and a separate, or phase-separable aqueous product 26. For example, cooled effluent 22 exiting effluent cooler 350 may be passed to separation stage 400 having equipment for performing both vapor-liquid phase separation and aqueous-organic phase separation, as necessary to resolve HDO product 24, aqueous product 26, and gaseous mixture 28, as described above. In cases in which solvent is used in preparation stage 100, recovered solvent 30 may also be separated in separation stage 400 and recycled to preparation stage 100, for example recovered solvent 30 may be combined with recycle portion 35 and/or make-up solvent 40 to provide solvent feed 12. Accordingly, it can be appreciated that a solvent recycle loop may be formed by recycling (i) recycle portion 35, or (ii) recovered solvent 30, back to preparation stage 100, or alternatively two solvent recycle loops may be formed by both of these practices in combination. In the case of any such solvent recycle loop(s), make-up solvent may be added at any convenient point(s) along such loop(s), such as upstream of preparation stage 100, directly to preparation stage 100, to an inlet (a suction side) of feed pump 50, or to HDO reactor 200. Aqueous product 26 may comprise substantially (e.g., greater than about 90 wt-%, greater than about 95 wt-%, or greater than about 99 wt-%) water comprising oxygen removed from oxygenated polymer 10 in HDO reactor 200. This product may also comprise little or no (e.g., less than about 1 wt-%, less than about 0.5 wt-%, or less than about 1000 wt-ppm) hydrocarbons as a result of substantially complete hydrodeoxygenation. Likewise, HDO product may comprise substantially (e.g., greater than about 90 wt-%, greater than about 95 wt-%, or greater than about 99 wt-%) hydrocarbons from reactions of oxygenated polymer 10 in HDO reactor 200 as described above, with substantially no (e.g., less than about 1 wt-%, less than about 0.5 wt-%, or less than about 1000 wt-ppm) water.

At least a portion of gaseous mixture 28, such as hydrocarbon-enriched portion 32 (e.g., being enriched in one or more lower molecular weight hydrocarbons such as methane, ethane, and/or propane) may be introduced to a reformer 600 for the net generation of reformer hydrogen 36. Hydrocarbon-enriched portion 32 may be obtained using gas separator 500, for example utilizing a membrane or an adsorbent (e.g., in the case of pressure-swing adsorption, or PSA) that also provides hydrogen-enriched portion 34. In the case of reformer 600 utilizing steam as a reactant, all or a portion of aqueous product 26 may be heated to generate this steam for introduction to reformer 600, with hydrocarbon-enriched portion 32 of gaseous mixture 28. Reformer hydrogen 36 and/or hydrogen-enriched portion 34 may be recycled, as recycle hydrogen 18, to HDO reactor 200 to satisfy some or all of the hydrogen required in this reactor. In the case of only some of the hydrogen requirement being satisfied, or otherwise during transient operating periods (e.g., startup), it may be necessary to add make-up hydrogen 38 to HDO reactor 20, for example by combining it with recycle hydrogen 18 upstream of this reactor. Optionally, reformer hydrogen 36, or a portion thereof, may be further enriched in hydrogen (e.g., by selective removal of CO, $CO_2$, and/or other gases) using an additional gas separator (not shown), for example utilizing a membrane or an adsorbent (e.g., in the case of pressure-swing adsorption, or PSA), to provide a high purity hydrogen-containing gas stream for recycle to HDO reactor.

In the configuration of HDO reactor 200 as illustrated in FIG. 2, which is namely a slurry reactor containing slurry bed 250" or suspension of HDO catalyst, reactant hydrogen 16, including any recycle hydrogen 18 and/or make-up hydrogen 38, may be passed (e.g., bubbled) upwardly through this bed. For example, a gas distributor at a lower inlet end of HDO reactor 200 may be used to introduce and distribute reactant hydrogen 16 at this end through slurry bed 250" of particles of an HDO catalyst as described herein. These particles may be suspended in a mixture of the flowable form of the oxygenated polymer, including any solvent, water, and a liquid portion of the HDO product residing in the reactor (portion of the HDO product that is liquid under the HDO conditions). Feed 14, on the other hand, may be introduced at a higher axial position of HDO reactor 200, for example in a headspace above slurry bed 250", containing gases that are ultimately separated as gaseous mixture 28 (see FIG. 1) that is used to provide recycle hydrogen 18. FIG. 2 more particularly illustrates different possibilities, according to which the effluent from HDO reactor 200, from which HDO product 24 is obtained, may be withdrawn as liquid HDO reactor effluent 201 and/or vapor HDO reactor effluent 202, depending on operating conditions. Although not specifically illustrated in FIG. 1, such possibilities also exist with respect to a trickle-bed reactor configuration or other reactor configuration. For example, liquid HDO reactor effluent 201 may be withdrawn (e.g., drained) as a continuous liquid stream, comprising at least a portion of HDO product 24 and/or intermediate derivatives as described above, from the bottom and/or sides of HDO reactor 200. This effluent may further comprise solvent, water, and possibly any unreacted oxygenated polymer and HDO catalyst particles. Alternatively or in combination, vapor HDO reactor effluent 202 may be withdrawn as a continuous vapor stream, comprising at least a portion of HDO product 24 and/or intermediate derivatives as described above. Any reactant hydrogen 16 that is not converted in HDO reactor 200 may be used as an entraining gas for conveying vapor HDO reactor effluent 202, although potentially a different entraining gas (e.g., a supplemental entraining gas such as $CO_2$ or $N_2$ may be used for this purpose). In addition to unconverted $H_2$, vapor HDO reactor effluent 202 may comprise non-condensable hydrocarbons, as well as other non-condensable gases, and possibly condensable hydrocarbons, as described above, as well as water vapor.

The optional separation of recycle portion 35 of solvent from either type of effluent 201, 202 is analogous to this optional step as illustrated in FIG. 1. Other processing alternatives, such as the use of supplemental deoxygenation reactor 300 to more completely deoxygenate either type of effluent 201, 202 or optionally respective portion 20a thereof following separation of recycle portion 35, are likewise analogous to those illustrated in FIG. 1. Such processing alternatives, which are likewise applicable to the embodiment of FIG. 2, include the use of downstream processing section 150 to resolve HDO product 24, in addition to recycle hydrogen 18 and/or recovered solvent 30. Regardless of the particular reactor configuration, HDO product 24 may be fractionated, using further separation equipment, for example a distillation column or series of distillation columns, to obtain substantially fully deoxygenated higher value liquid products such as gasoline boiling-range and/or diesel fuel boiling-range hydrocarbon fractions.

Figure 3:
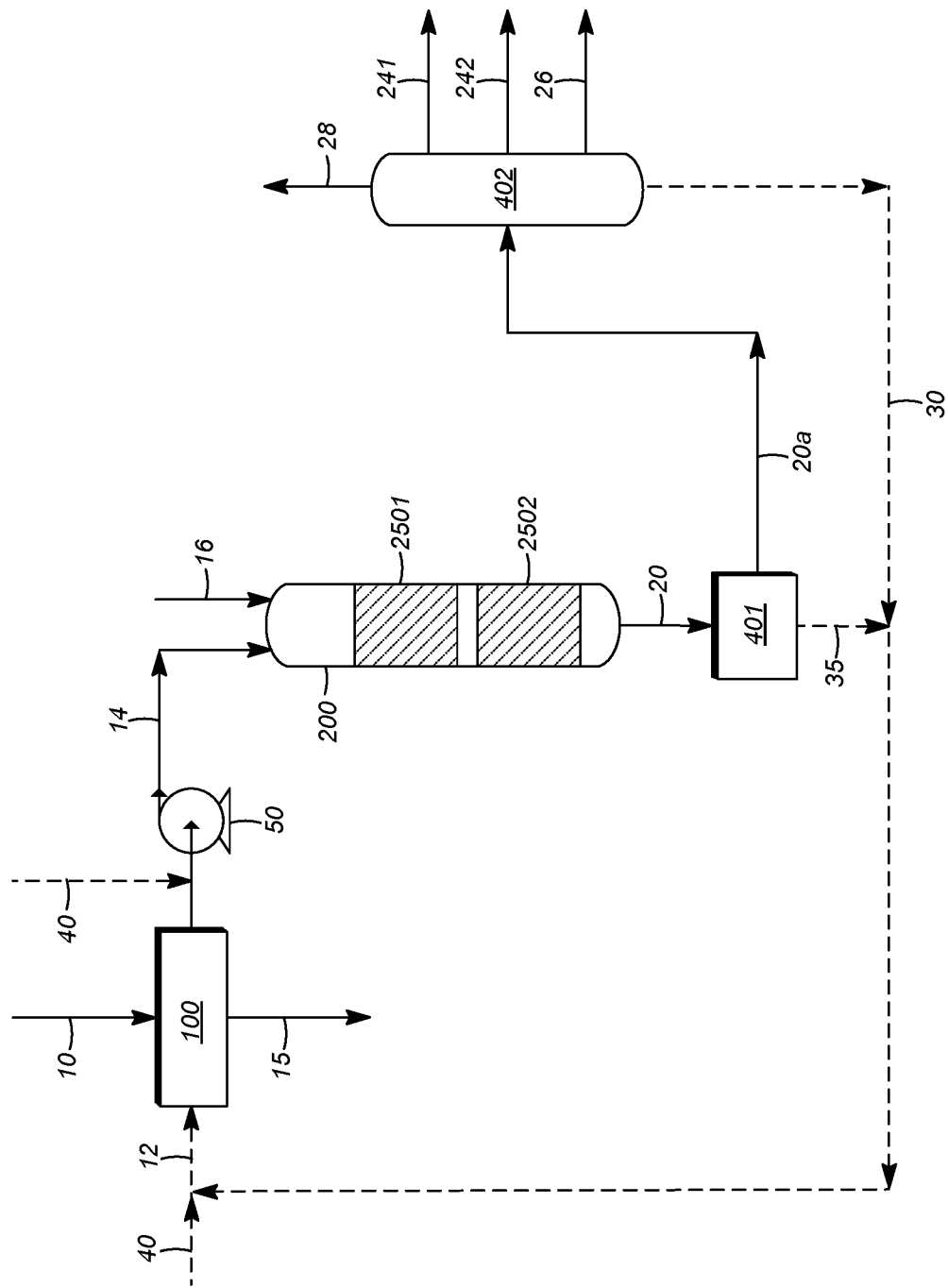
FIG. 3 is a schematic flow diagram of another alternative process, in which the hydrodeoxygenation of oxygenated polymers is integrated with the hydroprocessing of hydrocarbons.

FIG. 3 depicts a schematic flow diagram according to one option for integrating the hydrodeoxygenation of oxygenated polymers with the hydroprocessing of hydrocarbons. According to this embodiment, HDO reactor 200 is used to co-process feed 14 comprising the flowable form of oxygenated polymer 10 together with solvent available as make-up solvent 40, recycle portion 35, and/or recovered solvent 30. In this case, solvent available in any of these streams may be a hydrocarbon fraction that can be upgraded using fixed hydrotreating catalyst bed 2501 and optionally downstream, fixed hydrocracking catalyst bed 2502. For example, HDO reactor 200 may be a conventional hydrotreating or hydrocracking reactor used for upgrading particular hydrocarbon fractions (e.g., a diesel boiling-range fraction, vacuum gas oil (VGO), or other fraction obtained from the refining of crude oil) that that are also effective solvents for forming, in preparation stage 100, the flowable form of the oxygenated polymer. Such reactor 200 may advantageously serve the dual purpose of carrying out hydrodeoxygenation of oxygenated polymer 10, whereby integrated processes such as depicted in FIG. 3 may be the result of adapting processes and equipment associated with the conventional hydroprocessing of hydrocarbons to incorporate upstream preparation stage 100.

As depicted in FIG. 3, hydrotreating catalyst bed 2501 may be present in a hydrotreating zone within HDO reactor 200, whereas hydrocracking catalyst bed 2502, if used, may also be present within this reactor, but positioned in a hydrocracking zone, downstream of hydrotreating catalyst bed 2501. Alternatively, if hydrocracking is desired, for example according to embodiments in which the hydrocarbon fraction/solvent comprises relatively high molecular weight hydrocarbons having boiling points beyond those of diesel boiling-range hydrocarbons (e.g., in the case of VGO), a separate hydrocracking reactor downstream of the HDO reactor/hydrotreating reactor may be used. The HDO reactor effluent, which, in the embodiment of FIG. 3, may be hydrotreating zone effluent 20 (or optional hydrocracking zone effluent 20), may be subjected to various separation stages. For example, crude separation stage 401 (e.g., a vapor-liquid separation section) may be used for separating recycle portion 35 of the solvent from portion 20a of this effluent and/or refined separation stage 402 (e.g., a product fractionation section) may be used to resolve components of the HDO product, such as gasoline boiling-range fraction 241 and diesel boiling-range fraction 242, in addition to aqueous product 26. Refined separation stage 402 may also be used to separate recovered solvent 30, which may be recycled to preparation stage 100. According to some embodiments, crude separation stage 401 may not be necessary, such that the resolution of two or more components 28, 241, 242, 26, and 30 from the effluent of the HDO reactor/hydrotreating reactor may be performed effectively in refined separation stage 402 alone.

Yet further embodiments of the invention are directed to processes as described herein as an initial treatment of an overall process for the production of an upgraded polymer from a waste oxygenated polymer, such as PET (e.g., in the form of post-consumer PET flakes). If the upgraded polymer is the same type as the waste polymer, then the initial treatment may be that of an overall process for the effective "recycling" of the waste polymer. For example, as described herein, the hydrodeoxygenation of PET can be used to recover para-xylene, which may, in turn, be conveniently processed to upgraded PET according to known methods involving oxidation of para-xylene to its dicarboxylic acid derivative, namely terephthalic acid (TPA), optionally followed by esterification or possibly transesterification of an esterified intermediate, and then copolymerization with ethylene glycol. In other embodiments, the upgraded polymer may be different from the waste polymer, such that the initial treatment may be that of an overall process for the effective conversion of the waste polymer to a different polymer having a higher value at least in part due to its improved properties (e.g., purity).

For example, para-xylene recovered from PET may, in turn, be conveniently used in the production of other polyesters if the copolymerization of its dicarboxylic acid derivative is with a co-monomer having at least two hydroxyl functional groups (e.g., a diol) that is other than ethylene glycol (e.g., propylene glycol or butylene glycol). Other polyesters may also be produced in the case of copolymerization of a polyacid (e.g., a diacid) or its ester derivative with a co-monomer that is the dihydroxyl derivative of para-xylene, namely 1,4-di(hydroxymethyl)benzene. Alternatively, para-xylene recovered from PET may, in turn, be used in the production of a polyamide in the case of copolymerization of the dicarboxylic acid derivative of para-xylene with a co-monomer having at least two amino functional groups (e.g., a diamine). Other polyamides may also be produced in the case of copolymerization of a polyacid (e.g., a diacid) or its ester derivative with a co-monomer that is the diamino derivative of para-xylene, namely 1,4-(diaminomethyl)benzene. Yet other polyamides may be produced in the case of copolymerization of a diacyl derivative (e.g., a diacyl chloride derivative) of para-xylene, such as 1,4-di(chloroformylmethyl)benzene, with a co-monomer having at least two amino functional groups (e.g., a diamine). Alternatively, para-xylene recovered from PET may, in turn, be used in the production of a polyurethane in the case of copolymerization of the diisocyanate derivative of para-xylene, namely 1,4-(diisocyanatomethyl) benzene, with a co-monomer having at least two hydroxyl functional groups (e.g., a diol). Other polyurethanes may also be produced in the case of copolymerization of a polyisocyanate (e.g., a diisocyanate) with a co-monomer that is the dihydroxyl derivative of para-xylene, namely 1,4-(dihydroxymethyl)benzene.

As is apparent to one skilled in the art, having knowledge of the present disclosure, other hydrocarbons and their derivatives, recovered from oxygenated polymers in HDO processes as described herein as an initial treatment, may be used in an overall process for the production of an upgraded polymer from a waste oxygenated polymer. For example, following such initial treatment, the recovered hydrocarbon may be subjected to downstream processing according to known production methods and using established equipment and facilities, thereby improving the efficiency of production of the upgraded polymer. Whether the overall process involves "recycling" to produce the same type of polymer as the waste oxygenated polymer or a different polymer, the resulting upgraded polymer will generally be indistinguishable from virgin material in terms of its composition, appearance, and properties, leading to significant advantages over conventional waste plastic recovery and recycling operations.

The following examples are set forth as representative of the present invention. These examples are not to be construed as limiting the scope of the invention as other equivalent embodiments will be apparent in view of the present disclosure and appended claims.

Example 1

Experiments were performed to investigate the catalytic hydrodeoxygenation of PET. A 50 gram sample of this plastic was combined with 350 grams of solvent that was a mixture of tetralin and hexadecane. The PET, solvent, and 100 grams of sulfided CoMo catalyst were loaded into a laboratory scale reactor (Parr Instrument Company). The reactor was sealed and pressurized with hydrogen to 52 bar (750 psi) using a back pressure regulator, heated, and continuously stirred while maintaining reaction conditions over an operating period of 4.6 hours. These conditions included a temperature in the range of 309-341° C. (588-646° F.) and a hydrogen flow rate of 300 cc/min. The gas stream exiting the reactor was cooled to remove materials that were condensable under ambient conditions, and the remainder of this stream was periodically analyzed. Following the operating period, the reactor was opened and its liquid content was analyzed, in addition to the condensable materials that were collected over this period. It could be determined from the reaction products that the conversion of PET, based on oxygen removal from this polymer, was complete, i.e., 100%. Based on the initial quantity of PET, the calculated quantities of reaction products were 50 wt-% xylenes, 20 wt-% water, 21 wt-% $CO_2$, and 16 wt-% ethane. The uptake of hydrogen resulted in a contribution to these products of 7 wt-%.

Example 2

Polyethylene terephthalate (PET) is used as an oxygenated polymer in processes described herein, with various considerations being relevant in terms of its conversion by hydrodeoxygenation. For example, the structure of PET is formed of consistent repeating units, linked together by carbon-oxygen bonds, and PET has a melting temperature of about 250° C. (482° F.), whereas it undergoes thermolysis at about 350° C. (662° F.). An HDO reactor can therefore operate effectively at a temperature that is at or above the former temperature but still below the latter temperature, such as in a range from 300° C. (572° F.) to 340° C. (644° F.). Alternatively, if an effective solvent is used to aid in the preparation of a flowable form of PET, even lower HDO reactor temperatures are possible, at least for the purpose of heating the oxygenated polymer to a temperature suitable for being transferred (e.g., pumped) to the HDO reactor in a flowable form. A trickle-bed reactor may be used for the conversion, and, as a result of deoxygenation, the molecular sub-units obtained from the PET structure provide for the recovery of an HDO product comprising primarily para-xylene and a gaseous mixture comprising hydrocarbons that are primarily ethane.

To the extent that any oxygenated compounds (intermediate derivatives, or compounds having chemically bonded oxygen) such as 1,4-dihydroxymethylbenzene are obtained in the effluent of the HDO reactor, a second-stage or supplemental deoxygenation reactor may be utilized for their further and complete deoxygenation to hydrocarbons. Ethane, which is purified from a gaseous mixture obtained from a vapor-liquid phase separation of the effluent of the second-stage reactor, or possibly of the HDO reactor itself, is reformed to provide hydrogen as all or part of the reactant hydrogen. That is, reformed hydrogen and/or other components of recycle hydrogen, provided to the HDO reactor and/or supplemental deoxygenation reactor, sustains the process entirely or at least partly. Whether the process employs a single reaction stage, two reaction stages, or possibly more reaction stages, an HDO product stream, or a further refined product stream (e.g., following filtration, distillation, or other separation to which the HDO product is subjected), is that of a fine chemical such as highly-valued para-xylene in a pure or nearly pure state.

In addition, this example illustrates an initial treatment in an overall process that can utilize fine chemicals such as para-xylene in applications that require a high degree of purity. One such overall process is the effective "recycling" of PET by its conversion to para-xylene in a cost-effective manner, as described herein, followed by the further use of this para-xylene in the production of PET having all of the desired aesthetic and mechanical properties of virgin PET. This further use involves conventional steps of oxidation to terephthalic acid, optionally followed by esterification or possibly transesterification of an esterified intermediate, and then copolymerization with ethylene glycol. The economic value of the treatment of PET to provide para-xylene (e.g., as an initial treatment in an overall process of PET recycling), as described herein, is significant in view of probable scenarios whereby contaminated, heterogeneous flakes of used PET, for providing a feed, are available at a cost of approximately $100-$150 per ton. Each ton of this oxygenated polymer might produce on the order of 0.55 tons of para-xylene, valued at approximately $900 per ton.

Example 3

Compared to PET, the biopolymer lignin includes a wider variety of useful and potentially valuable molecular sub-units that can be liberated as hydrocarbons in processes described herein. Lignin as a byproduct of paper manufacturing, however, is conventionally combusted for energy, i.e., very limited value is obtained. Hydrodeoxygenation therefore advantageously has the potential for deriving far greater value, in making the hydrocarbon molecules corresponding to its molecular sub-units, many of which are aromatic, available as a substantially fully deoxygenated HDO product. Various considerations are relevant in terms of the conversion of this oxygenated polymer by hydrodeoxygenation. For example, its structure includes a complex mixture of large macromolecules as well as inorganic impurities at the molecular, nano, meso, and macro-scale. Within the macromolecules, several different kinds of aromatic and non-aromatic molecular sub-units are linked together by carbon-oxygen bonds.

Lignin has a melting temperature of about 150° C.-250° C. (302° F.-482° F.), whereas it undergoes thermolysis at about 300° C. (572° F.). At least for the purpose of heating lignin to a temperature suitable for being transferred (e.g., pumped) to the HDO reactor, a temperature may be selected that is at or above the former temperature but still significantly below the latter temperature, such as in a range from 150° C. (302° F.) to 175° C. (347° F.). Alternatively, if an effective solvent is used to aid in the preparation of a flowable form of lignin, even lower temperatures may be selected, such as in a range from 110° C. (230° F.) to 140° C. (284° F.). Higher HDO reactor temperatures, such as those within any of the ranges given above, may be used for the conversion of lignin to an HDO product. The products of the HDO reaction(s) are complex, and will include oxygenated and de-oxygenated fragments of the lignin macromolecules. A wide range of molecular species, both aromatic and non-aromatic, is obtained in the HDO product.

To the extent that any oxygenated compounds (intermediate derivatives, or compounds having chemically bonded oxygen), such as phenyl propanoid alcohols having saturated substituents about the phenyl ring(s), are obtained in the effluent of the HDO reactor, a second-stage or supplemental deoxygenation reactor may be utilized for their further and complete deoxygenation to hydrocarbons. Light hydrocarbons such as methane, ethane, and propane, which are purified from a gaseous mixture obtained from a vapor-liquid phase separation of the effluent of the second-stage reactor, or possibly of the HDO reactor itself, are reformed to provide hydrogen as all or part of the reactant hydrogen. That is, reformed hydrogen and/or other components of recycle hydrogen, provided to the HDO reactor and/or supplemental deoxygenation reactor, sustains the process entirely or at least partly. Whether the process employs a single reaction stage, two reaction stages, or possibly more reaction stages, an HDO product stream, or one or more further refined product stream(s) (e.g., following filtration, fractionation, or other separation to which the HDO product is subjected), is/are characteristic of a fuel (e.g., gasoline and/or diesel fuel) with few or no detrimental impurities. To the extent that the HDO product stream comprises one or more fine chemicals, additional separations to resolve these with sufficient purity to exploit their commercially higher value are generally required. The economic value of the treatment of lignin to produce a complex mixture of hydrocarbons, as described herein, is significant in view of probable scenarios whereby lignin, for providing a feed, is available at a cost of approximately $20 per ton, if obtained from a papermaking operation. Each ton of this oxygenated polymer might produce on the order of 0.55 tons of fuel-grade hydrocarbons, valued at approximately $500 per ton.

Overall, aspects of the disclosure are associated with processes for obtaining liquid hydrocarbons, for example as fine chemicals or a fuel, by converting plastics through HDO, and especially thermoplastic oxygenated polymers from which the derivation of significant value is problematic using conventional processing methods. For example, such oxygenated polymers are often treated as wastes, and their disposal is often an expensive and challenging proposition. Although in the foregoing specification this disclosure has been described in relation to certain preferred embodiments thereof, and details have been set forth for purpose of illustration, it will be apparent to those skilled in the art, having knowledge of the present disclosure, that these details can be varied without departing from the basic principles of the disclosure. Accordingly, features of the disclosure are susceptible to modification, alteration, changes or substitution without departing from the substance of the disclosure. The specific embodiments illustrated and described herein are for illustrative purposes only, and not limiting of the invention as set forth in the appended claims.

What is claimed is:

1. A process for the production of hydrocarbons from an oxygenated polymer, the process comprising:
    partly or completely dissolving the oxygenated polymer in a solvent to produce a solvated oxygenated polymer, and, at a temperature between the melting temperature and the thermal decomposition temperature of the oxygenated polymer, filtering the solvated oxygenated polymer to separate impurities, including solids, existing under the heated, solvated condition of the oxygenated polymer; and
    contacting reactant hydrogen and a feed comprising the solvated oxygenated polymer, obtained from the filtering, with a solid hydrodeoxygenation (HDO) catalyst at a hydrogen partial pressure from about 14 bar (about 200 psi) to about 35 bar (about 510 psi), to produce an HDO product comprising the hydrocarbons.

2. The process of claim 1, wherein the reactant hydrogen comprises both fresh and recycle hydrogen.

3. The process of claim 1, wherein the feed comprising the solvated oxygenated polymer accounts for greater than about 90 wt-% of non-gaseous components added to an HDO reactor containing the solid HDO catalyst.

4. The process of claim 1, wherein a yield of solids from the process, based on the feed, is less than about 1 wt-%.

5. The process of claim 1, wherein the oxygenated polymer is a bio-based thermoplastic polymer or a petroleum-based thermoplastic polymer.

6. The process of claim 1, wherein the HDO product is provided following further deoxygenating of a partially deoxygenated intermediate.

7. The process of claim 1, wherein the HDO product is provided following a separation from a gaseous mixture and/or aqueous product.

8. The process of claim 7, wherein the oxygenated polymer has nitrogen and/or sulfur atoms, and wherein the gaseous mixture comprises ammonia ($NH_3$) and hydrogen sulfide ($H_2S$) derived from the nitrogen and/or sulfur atoms.

9. The process of claim 1, wherein the partly or completely dissolving the oxygenated polymer in the solvent is performed in a preparation stage.

10. The process of claim 9, wherein the preparation stage comprises both heating the oxygenated polymer and the partly or completely dissolving the oxygenated polymer in the solvent.

11. The process of claim 10, wherein the solvent comprises hydrocarbons or forms hydrocarbons in the process.

12. The process of claim 11, wherein the solvent is product of crude oil refining or paper manufacturing.

13. The process of claim 1, wherein the oxygenated polymer is polyethylene terephthalate (PET) and the hydrocarbons include para-xylene.

14. The process of claim 1, wherein the oxygenated polymer is lignin and the hydrocarbons include gasoline boiling-range hydrocarbons and diesel boiling-range hydrocarbons.

15. The process of claim 1, wherein the solid HDO catalyst comprises at least one Group 8 metal and at least one Group 6 metal, supported on an inorganic refractory metal oxide, a zeolite, or porous activated carbon.

16. The process of claim 1, wherein the solid HDO catalyst is contained in an HDO reactor.

17. The process of claim 16, wherein the HDO product is obtained from separating the HDO product from an HDO reactor effluent that is withdrawn from the HDO reactor.

18. The process of claim 17, wherein the HDO reactor effluent comprises a partially deoxygenated intermediate and the HDO product is obtained from further deoxygenating the partially deoxygenated intermediate in a supplemental deoxygenation reactor, withdrawing a supplemental deoxygenation reactor effluent, and separating the HDO product from the supplemental deoxygenation reactor effluent.

19. The process of claim 16, wherein the HDO reactor is a trickle bed reactor or a slurry reactor.

20. The process of claim 17, wherein the HDO reactor effluent, from which the HDO product is obtained, is a gaseous HDO reactor effluent or a liquid HDO reactor effluent.

21. The process of claim 17, wherein separating the HDO product comprises separation from a gaseous mixture and/or aqueous product.

22. The process of claim 21, wherein the oxygenated polymer has nitrogen and/or sulfur atoms, and wherein the gaseous mixture comprises ammonia ($NH_3$) and hydrogen sulfide ($H_2S$) derived from the nitrogen and/or sulfur atoms.

23. The process of claim 1, wherein the solid HDO catalyst is contained in:
    a trickle-bed reactor, in which flows of the reactant hydrogen and feed are downward though a fixed bed of the HDO catalyst, or a slurry reactor containing a slurry of the catalyst, into which the reactant hydrogen and feed are introduced and mixed.

24. The process of claim 17, further comprising separating unconverted solvent from the HDO reactor effluent and recycling the unconverted solvent to a preparation stage for said partly or completely dissolving the oxygenated polymer in the solvent.

25. The process of claim 16, wherein the oxygenated polymer is PET and the hydrocarbons include para-xylene.

26. A process for the production of an upgraded polymer from a waste oxygenated polymer having oxygen atoms in a backbone of the waste oxygenated polymer, the process comprising:

partly or completely dissolving the waste oxygenated polymer in a solvent to produce a solvated waste oxygenated polymer, and, at a temperature between the melting temperature and the thermal decomposition temperature of the waste oxygenated polymer, filtering the solvated waste oxygenated polymer to separate impurities, including solids, existing under the heated, solvated condition of the waste oxygenated polymer;

contacting reactant hydrogen and a feed comprising the solvated waste oxygenated polymer, obtained from the filtering, with a solid hydrodeoxygenation (HDO) catalyst at a hydrogen partial pressure from about 14 bar (about 200 psi) to about 35 bar (about 510 psi), to provide an HDO product comprising hydrocarbons obtained from molecular sub-units between the oxygen atoms in the backbone of the waste oxygenated polymer; and using the hydrocarbons for the production of the upgraded polymer.

27. The process of claim 26, wherein the waste oxygenated polymer is polyethylene terephthalate (PET), and wherein the filtering is performed at a temperature from about 250° C. to about 350° C.

28. The process of claim 26, wherein the solvent comprises a hydrocarbon.

* * * * *